United States Patent
Schober et al.

(10) Patent No.: US 12,074,813 B2
(45) Date of Patent: Aug. 27, 2024

(54) RESOURCE CONFIGURATION FOR A BANDWIDTH PART FOR A WIRELESS NETWORK

(71) Applicant: NOKIA TECHNOLOGIES OY, Espoo (FI)

(72) Inventors: Karol Schober, Helsinki (FI); Kari Juhani Hooli, Oulu (FI); Esa Tapani Tiirola, Oulu (FI); Sami-Jukka Hakola, Kempele (FI)

(73) Assignee: Nokia Technologies Oy, Espoo (FI)

( * ) Notice: Subject to any disclaimer, the term of this patent is extended or adjusted under 35 U.S.C. 154(b) by 357 days.

(21) Appl. No.: 17/310,624

(22) PCT Filed: Feb. 14, 2019

(86) PCT No.: PCT/FI2019/050117
§ 371 (c)(1),
(2) Date: Aug. 13, 2021

(87) PCT Pub. No.: WO2020/165487
PCT Pub. Date: Aug. 20, 2020

(65) Prior Publication Data
US 2022/0150008 A1    May 12, 2022

(51) Int. Cl.
*H04L 5/00*    (2006.01)
(52) U.S. Cl.
CPC .......... *H04L 5/0042* (2013.01); *H04L 5/0007* (2013.01)
(58) Field of Classification Search
CPC ... H04L 5/0042; H04L 5/0007; H04L 5/0048; H04L 5/0053; H04L 5/0094;
(Continued)

(56) References Cited

U.S. PATENT DOCUMENTS

2017/0208592 A1\* 7/2017 Rico Alvarino ...... H04L 5/0048
2018/0048511 A1    2/2018 Hakola et al.
(Continued)

FOREIGN PATENT DOCUMENTS

CN    108966181 A    12/2018
JP    2021516008 A    6/2021
(Continued)

OTHER PUBLICATIONS

International Search Report and Written Opinion for International Application No. PCT/FI2019/050117, mailed on Nov. 14, 2019, 15 pages.
(Continued)

*Primary Examiner* — Rushil P. Sampat
(74) *Attorney, Agent, or Firm* — Brake Hughes Bellermann LLP

(57) ABSTRACT

According to an example embodiment, a method may include determining, by a user equipment in a wireless network, a starting physical resource block (PoinA) of a common physical resource block grid that is associated with a wideband channel, wherein a plurality of bandwidth parts are provided within the common physical resource block grid, each bandwidth part having a bandwidth that is less than the bandwidth of the wideband channel; determining, by the user equipment, a wideband channel guard band for the wideband channel, the wideband channel guard band provided between a lowest frequency of the wideband channel and a first usable physical resource block of the common physical resource block grid; and, determining, by the user equipment for at least one bandwidth part (BWPI) of the plurality of bandwidth parts, a bandwidth part-specific physical resource block grid that is a subset of the common physical resource block grid.

17 Claims, 9 Drawing Sheets

(58) Field of Classification Search
CPC .... H04L 5/0044; H04W 72/23; H04W 4/025; H04W 56/001; H04W 64/003; H04W 72/04; H04W 72/0453

See application file for complete search history.

(56) References Cited

U.S. PATENT DOCUMENTS

| | | | | |
|---|---|---|---|---|
| 2019/0028315 | A1* | 1/2019 | Park | H04B 7/0413 |
| 2019/0182016 | A1* | 6/2019 | Guo | H04L 5/0094 |
| 2020/0068512 | A1* | 2/2020 | Xue | H04L 5/0053 |
| 2020/0252934 | A1* | 8/2020 | Xue | H04L 5/0044 |

FOREIGN PATENT DOCUMENTS

| | | |
|---|---|---|
| JP | 2022509681 A | 1/2022 |
| WO | 2016043565 A1 | 3/2016 |
| WO | 2017183926 A1 | 10/2017 |
| WO | 2019013564 A1 | 1/2019 |

OTHER PUBLICATIONS

3GPP TS 38.101-1, V15.3.0; "3rd Generation Partnership Project; Technical Specification Group Radio Access Network; NR; User Equipment (UE) radio transmission and reception; Part 1: Range 1 Standalone, (Release 15)"; Sep. 2018; 219 pages.

3GPP TS 38.211, V15.4.0; "3rd Generation Partnership Project; Technical Specification Group Radio Access Network; NR; Physical channels and modulation; (Release 15)"; Dec. 2018; Sophia Antipolis, Valbonne, France; 96 pages.

3GPP TSG-RAN WG4 Meeting #89, R4-1814860; "Carrier Bandwith Configurations and RF Requirement"; Agenda item: 7.5.1 [NR_newRAT-Core]; Source: Nokia, Nokia Shanghai Bell; Spokane, Washington, USA; Nov. 12-16, 2018; 8 pages.

3GPP TSG RAN WG1 Meeting AH-1901, R1-1900349; Agenda item: 7.2.2.2.5; Source: Nokia, Nokia Shanghai Bell; "On Wideband Operation in NR-U"; Taipei, Taiwan; Jan. 21-25, 2019; 8 pages.

Substantive Examination Report received for Indonesia Patent Application No. P00202107343, mailed on Oct. 9, 2023, 6 pages.

Office Action for Japanese Patent Application No. 2021-547705, mailed on Oct. 24, 2022, 8 pages.

3GPP TSG-RAN WG4 Meeting #89, R4-1815656; "On Different Carrier BW in 5GHz NR-U Operation"; Source: Ericsson; Agenda Item: 10.2.2; Spokane, Washington, USA; Nov. 12-16, 2018, 3 pages.

3GPP TSG-RAN WG4 Meeting AH-1801, R4-1800914; "Remaining Issues of Minimum Guardband and Transmission Bandwidth Configuration"; Agenda Item: 4.2.1.3; Source: Intel Corporation; San Diego, California, USA; Jan. 22-26, 2018; 3 pages.

European Search Report for Application No. 19915377.6, mailed on Aug. 18, 2022, 7 pages.

Office Action for Vietnam Patent Application No. 1-2021-05290, dated Sep. 30, 2021, 2 pages.

Office Action for Vietnam Application No. 1-2021-05290, mailed on Aug. 14, 2023, 4 pages.

Office Action for India Application No. 202147040869, mailed on Mar. 28, 2022, 6 pages.

Office Action and Search Report for Chinese Application No. 201980095289.0, mailed on Feb. 20, 2024, 11 pages.

ETSI EN 301 893, V2.1.1; "5 Ghz RLAN; Harmonised Standard covering the essential requirements of article 3.2 of Directive 2014/53/EU"; May 2017; 122 pages.

3GPP TSG-RAN WG4 Meeting #88b, R4-1814069; "CR on Updating Requirement for BWP Switching Delay in TS38.133 (Section 8.6)"; Chengdu, China; Oct. 8-12, 2018; 2 pages.

3GPP TSG RAN WG1 Meeting #96, R1-190xxxx; "Draft Report of 3GGPP TSG RAN WG1 #AH_1901 V0.1.0 (Taipei, Taiwan, Jan. 21 - 25, 2019)"; Athens, USA; Feb. 25-Mar. 1, 2019; 104 pages.

3GPP TSG RAN Meeting #82, RP-182878 (revision of RP-182806); "New WID on NR-Based Access to Unlicensed Spectrum"; Source: Qualcomm Inc.; Agenda Item: 9.1.1; Sorrento, Italy; Dec. 10-13, 2018; 7 pages.

3GPP TG RAN WG1 Meeting #92, R1-1802526; "Potential Solutions and Techniques for NR Unlicensed"; Agenda item: 7.6.4; Source: Nokia, Nokia Shanghai Bell; Athens, Greece; Feb. 26-Mar. 2, 2018; 10 pages.

3GPP TS 38.322; V15.4.0; "3rd Generation Partnership Project; Technical Specification Group Radio Access Network; NR; Radio Link Control (RLC) protocol specification (Release 15)"; Dec. 2018; 33 pages.

3GPP TS 38.331; V15.4.0; "3rd Generation Partnership Project; Technical Specification Group Radio Access Network; NR; Radio Resource Control (RRC) protocol specification (Release 15)"; Dec. 2018; 474 pages.

3GPP TSG RAN Meeting #80, RP-181339, Revision of RP-172021; "Revised SID on NR-based Access to Unlicensed Spectrum", La Jolla, USA; Source: Qualcomm Incorporated; Agenda Item: 9.4.3; Jun. 11-14, 2018; 5 pages.

3GPP TR 38.874; V16.0.0; "3rd Generation Partnership Project; Technical Specification Group Radio Access Network; NR; Study on Integrated Access and Backhaul; (Release 16)"; Dec. 2018; 111 pages.

3GPP TR 38.889; V16.0.0; "3rd Generation Partnership Project; Technical Specification Group Radio Access Network; Study on NR-based access to unlicensed spectrum (Release 16)"; Dec. 2018; 119 pages.

3GPP TS 38.101-1; V15.4.0; "3rd Generation Partnership Project; Technical Specification Group Radio Access Network; NR; User Equipment (UE) radio transmission and reception; Part 1: Range 1 Standalone (Release 15)"; Dec. 2018; 223 pages.

* cited by examiner

| BWP index (n) | Sub-band index | | | |
|---|---|---|---|---|
| | 0 | 1 | 2 | 3 |
| 0 | ■ | | | |
| 1 | | ■ | | |
| 2 | | | ■ | |
| 3 | | | | ■ |
| 4 | ■ | ■ | | |
| 5 | | ■ | ■ | |
| 6 | | | ■ | ■ |
| 7 | ■ | ■ | ■ | |
| 8 | | ■ | ■ | ■ |
| 9 | ■ | ■ | ■ | ■ |

FIG. 4

RESOURCE CONFIGURATION FOR A BANDWIDTH PART FOR A WIRELESS NETWORK

CROSS-REFERENCE TO RELATED APPLICATIONS

This application is a national stage entry of International Application No. PCT/FI2019/050117, filed Feb. 14, 2019, entitled "RESOURCE CONFIGURATION FOR A BANDWIDTH PART FOR A WIRELESS NETWORK" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include: determining, by a user equipment in a wireless network, a starting physical resource block of a common physical resource block grid that is associated with a wideband channel, wherein a plurality of bandwidth parts are provided within the common physical resource block grid, each bandwidth part having a bandwidth that is less than the bandwidth of the wideband channel; determining, by the user equipment, a wideband channel guard band for the wideband channel, the wideband channel guard band provided between a lowest frequency of the wideband channel and a first usable physical resource block of the common physical resource block grid; and, determining, by the user equipment for at least one bandwidth part of the plurality of bandwidth parts, a bandwidth part-specific physical resource block grid that is a subset of the common physical resource block grid.

According to an example embodiment, an apparatus may include means for determining, by a user equipment in a wireless network, a starting physical resource block of a common physical resource block grid that is associated with a wideband channel, wherein a plurality of bandwidth parts are provided within the common physical resource block grid, each bandwidth part having a bandwidth that is less than the bandwidth of the wideband channel; means for determining, by the user equipment, a wideband channel guard band for the wideband channel, the wideband channel guard band provided between a lowest frequency of the wideband channel and a first usable physical resource block of the common physical resource block grid; and, means for determining, by the user equipment for at least one bandwidth part of the plurality of bandwidth parts, a bandwidth part-specific physical resource block grid that is a subset of the common physical resource block grid.

According to an example embodiment, an apparatus may include: at least one processor; and at least one memory including computer program code; the at least one memory and the computer program code configured to, with the at least one processor, cause the apparatus at least to: determine, by a user equipment in a wireless network, a starting physical resource block of a common physical resource block grid that is associated with a wideband channel, wherein a plurality of bandwidth parts are provided within the common physical resource block grid, each bandwidth part having a bandwidth that is less than the bandwidth of the wideband channel; determine, by the user equipment, a wideband channel guard band for the wideband channel, the wideband channel guard band provided between a lowest frequency of the wideband channel and a first usable physical resource block of the common physical resource block grid; and, determine, by the user equipment for at least one bandwidth part of the plurality of bandwidth parts, a bandwidth part-specific physical resource block grid that is a subset of the common physical resource block grid.

According to an example embodiment, a non-transitory computer-readable storage medium comprising instructions stored thereon that, when executed by at least one processor, are configured to cause a computing system to perform a method of: determining, by a user equipment in a wireless network, a starting physical resource block of a common physical resource block grid that is associated with a wideband channel, wherein a plurality of bandwidth parts are provided within the common physical resource block grid, each bandwidth part having a bandwidth that is less than the bandwidth of the wideband channel; determining, by the user equipment, a wideband channel guard band for the wideband channel, the wideband channel guard band provided between a lowest frequency of the wideband channel and a first usable physical resource block of the common physical resource block grid; and, determining, by the user equipment for at least one bandwidth part of the plurality of bandwidth parts, a bandwidth part-specific physical resource block grid that is a subset of the common physical resource block grid.

The details of one or more examples of embodiments are set forth in the accompanying drawings and the description below. Other features will be apparent from the description and drawings, and from the claims.

BRIEF DESCRIPTION OF THE DRAWINGS

FIG. 4 is a diagram illustrating a plurality of bandwidth parts (BWPs) according to another example embodiment.

DETAILED DESCRIPTION

Figure 1:
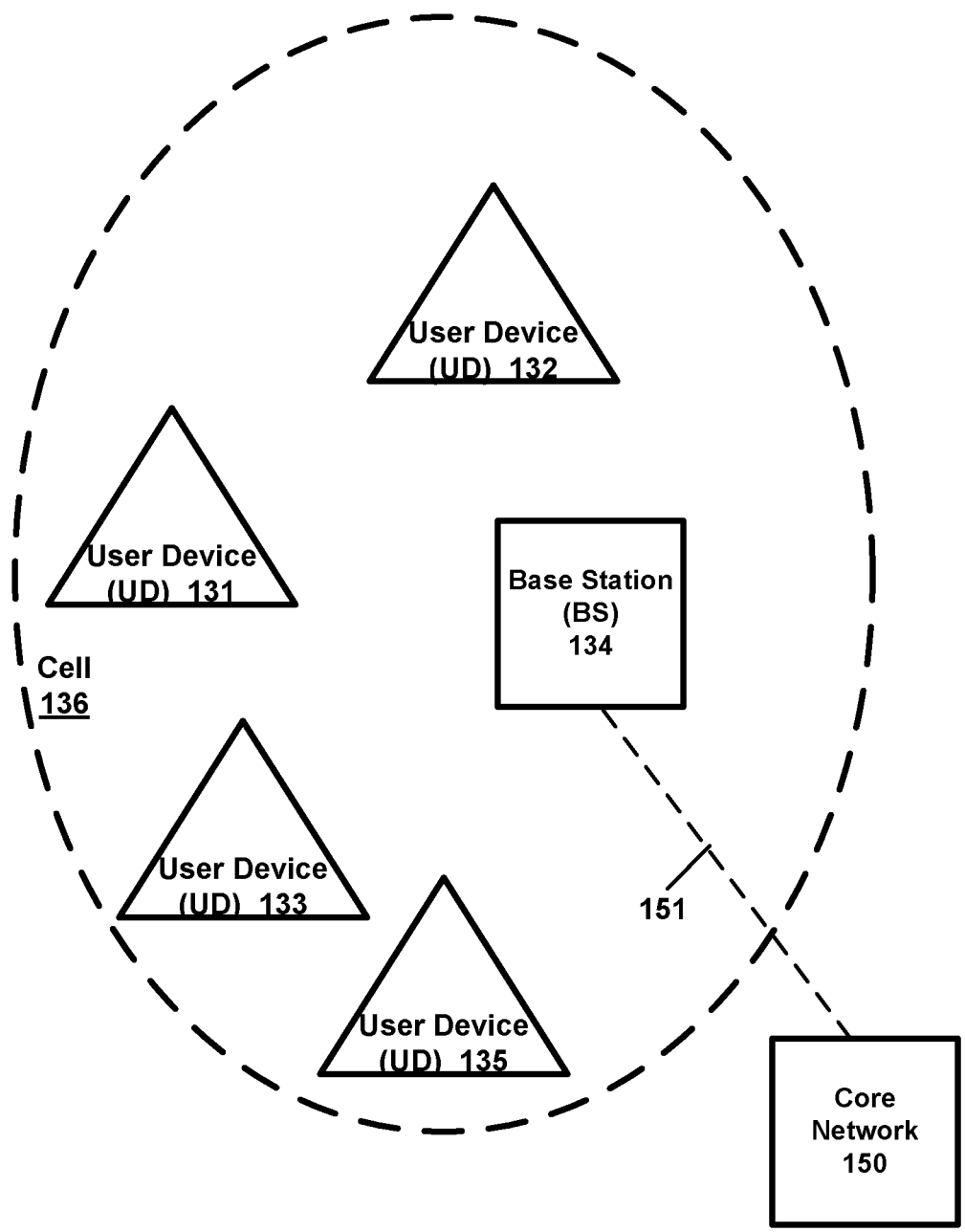
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A RAN node may be or may include, e.g., a base station (BS), an access point (AP), a gNB, an eNB, or portion thereof (such as a centralized unit (CU) and/or a distributed unit (DU) in the case of a split BS or split gNB).

According to an illustrative example, a radio access network (RAN) is part of a mobile telecommunication system. A RAN may include one or more RAN nodes that implement a radio access technology, e.g., to allow one or more UEs to have access to a network or core network. Thus, for example, the RAN (RAN nodes) may reside between one or more user devices or UEs (or mobile terminals) and a core network. According to an example embodiment, each RAN node (e.g., BS, eNB, gNB, CU/DU, . . . ) may provide one or more wireless communication services for one or more UEs or user devices, e.g., to allow the UEs to have wireless access to a network, via the RAN node. Also, in another embodiment, a DU (data unit) part of the IAB node (relay node) may perform or facilitate gNB/BS functionalities of various example embodiments or techniques described herein. And a MT (mobile termination) part of the IAB node may provide or perform UE functionalities of various example embodiments or techniques described herein.

Each RAN node (e.g., BS or gNB) may perform or provide wireless communication services, e.g., such as allowing UEs or user devices to establish a wireless connection to the RAN node and sending data to and/or receiving data from one or more of the UEs. For example, after establishing a connection to a UE, a RAN node may forward data to the UE that is received from a network or the core network, and/or forward data received from the UE to the network or core network. RAN nodes may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node (e.g., BS or gNB) may perform.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example embodiments or techniques described herein may be applied to various types of user devices or data service types or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

The various example embodiments may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

Since the amount of available licensed spectrum is limited and costly, deployment of cellular services has been deployed in unlicensed bands, including the 5 GHz ISM bands, which may also be used by other wireless technologies, such as Wi-Fi, Bluetooth, ZigBee, and some other radio access technologies (RATs). The use of unlicensed band is an illustrative example.

Fair coexistence of multiple radio access technologies (RATs) is under study, e.g., in 5G New Radio (NR) access technology. One solution is to apply listen-before-talk (LBT) protocol. It is perhaps the most well-known contention-based protocol and used e.g., in IEEE 802.11 (Wi-Fi), LTE Licensed Assisted Access and MulteFire. A contention-based protocol (CBP) is a communications protocol for allowing many users to use the same radio channel without pre-coordination. For example, in some types of wireless services deployments, a contention-based access mechanism may be used where a wireless device (e.g., UE or gNB, or other wireless device) may use listen-before-talk (LBT) or use clear channel access (CCA) to sense a wireless media in one or more sub-bands, before using the sub-band or sub-bands to transmit data or control information.

According to an example embodiment, a wideband channel (e.g., 80 MHz) may include one or more sub-bands, (e.g., 2, 3, 4 or more 20 MHz sub-bands). As an illustrative example, a wideband channel (which may also be referred to as a carrier or wideband carrier) may be an 80 MHz wideband channel that includes four 20 MHz sub-bands. Other sizes (frequency widths) of wideband channels and sub-bands may be used. For example, an 80 MHz wideband channel may be supported for NR-based design, e.g., with 30 kHz subcarrier spacing and 4k FFT (Fast Fourier Transform). Other sizes of a wideband channel may be used, such as 160 MHz with 60 kHz SCS, for example. In an illustrative example, a contention-based mechanism (LBT or CCA) may be used per-sub-band, where a wireless device may transmit signals on (e.g., all or part of) a sub-band only after a CCA result was positive (indicating that the sub-band is not occupied and may be used for transmission).

By way of illustrative examples, there may exist a number of different listen-before-talk (LBT) options or scenarios, such as one or more of the following:

Scenario-0: DL (downlink) only scenario. gNB performs sub-band specific LBT (or CCA) and determines temporal BWP based on that (UE RX operates according to temporal BWP determined by gNB);

Scenario-1: DL+UL (uplink). Shared COT with CAT1 Immediate transmission (without LBT before UL transmission). The gap between end of DL and start of UL may be up-to 16 microseconds. gNB performs sub-band specific LBT and determines temporal BWP based on that. UL transmission is performed based on gNB acquired COT and temporal BWP determined by gNB (UE RX/TX (receiving and/or transmitting) operates according to temporal BWP determined by gNB);

Scenario-2: Shared COT with CAT2 LBT. The gap between end of DL and start of UL may be up-to 25 microseconds. gNB performs sub-band specific LBT and based on that determines the $1^{st}$ temporal BWP. UE performs sub-band based LBT according to the $1^{st}$ temporal BWP and determines the $2^{nd}$ temporal BWP (i.e., the actual temporal BWP) based on that (UE RX (receiving) operates according to temporal BWP determined by gNB, UE TX (transmitting) may operate according to temporal BWP determined by UE); and Scenario-3: UL only scenario UE performs sub-band specific LBT and determines the temporal BWP based on that. (UE TX operates according to temporal BWP determined by UE).

According to an example embodiment, a BS/gNB and/or a UE (or other wireless device may transmit and/or receive on a part of a bandwidth or a part of a channel, which may be referred to as a bandwidth part (BWP). Also, according to an example embodiment, a BWP (or resources of some portion of a bandwidth or a portion of a channel) that is used or selected for use (or determined as being available for use), e.g., based on CCA or LBT and/or based on scheduling by base station, may be referred to as a temporal BWP because this temporal BWP is temporarily available for use, e.g., during a channel occupancy time (COT) or other time period.

Also, according to another illustrative example embodiment, a temporal BWP may include a part (or portion) of (the Release 15 (R15)) bandwidth parts (BWP) configured on the carrier within the wideband channel (e.g., on a portion of R15 BWP spanning 80 MHz wideband channel), for example. Thus, in an example embodiment, a part (or portion) of a BWP that is used or selected for use (or determined as being available for use), e.g., based on CCA or LBT and/or based on scheduling by base station, may be referred to as a temporal BWP because this temporal BWP is temporarily available for use, e.g., during a channel occupancy time (COT).

In an illustrative example embodiment, a temporal BWP may use a portion or part of frequency domain resources of a channel or bandwidth. For example, a temporal BWP may use a part of (a R15 (New Radio Release 15)) BWP configured and/or activated to the UE. As a non-limiting example, a plurality of temporal bandwidth parts (BWPs) may be defined and provided within a (R15 (New Radio Release 15)) BWP. For example, each temporal BWP may include one or more sub-bands, within the R15 BWP. For example, for a R15 BWP of 80 MHz that includes four 20 MHz sub-bands, each temporal BWP may include either: one 20 MHz sub-band; two contiguous 20 MHz sub-bands (providing a BWP bandwidth of 40 MHz), or three contiguous 20 MHz sub-bands (providing a BWP bandwidth of 60 MHz), according to an illustrative example. Also, in some cases, one or more temporal BWPs may be provided within a R15 BWP that may include two or more non-contiguous sub-bands. Thus, a set of temporal BWPs may be available, or which may be configured for a UE (or only some of the temporal BWPs may be configured for use by the UE). While many temporal BWPs may be configured for use, a UE may select (or be indicated to use) one of the temporal BWPs for transmitting or receiving.

A wideband channel may include a set of physical resource blocks (PRBs), where each PRB may include a set of frequency resources or a set of time-frequency resources. According to an illustrative example embodiment, a wideband channel (e.g., 80 MHz, according to an illustrative example) on which R15 (New Radio Release 15, e.g. TS 38.21x series) BWPs and associated temporal BWPs are configured, may include a set of physical resource blocks (PRBs). For example, an illustrative PRB may include 12 (or other number of) subcarriers and may have a frequency width (or bandwidth) of 12*SCS, where SCS refers to the subcarrier spacing. The set of PRBs for a wideband channel may be referred to as a common physical resource block (PRB) grid associated with (or for) a wideband channel.

According to an example embodiment, the wideband channel may be provided on or for a carrier (that is at an associated carrier frequency). The common PRB grid of a carrier (at a particular carrier frequency) within a wideband channel may be identified by a starting PRB (e.g., which may be referred to herein as PointA) of the common PRB grid. In some cases, PointA may be located outside the wideband channel. On the common PRB grid, the location of the associated carrier may be defined by a first usable PRB of the common PRB grid. The first usable PRB is a first PRB that may be used for transmission or reception of signals. The first usable PRB of the common PRB grid may, for example, be (or may be located at) a frequency (or carrier) offset from a starting (or first) PRB of the wideband channel or common PRB grid, for example. Other information may be used to identify the common PRB grid or the carrier of the common PRB grid, such as a last or ending PRB, number of PRBs and/or a PRB width. There may typically be minimum guard band requirements for the wideband channel (e.g., guard bands, including one or more PRBs, at the beginning and/or end of the wideband channel, that are not used for transmission). In an example embodiment, the first usable PRB and last usable PRB of the wideband channel is (or may be) located within the wideband channel.

Furthermore, each temporal BWP (further just 'BWP') may have its own set of PRBs within the PRBs of the wideband channel. Thus, each BWP within a wideband channel may have a BWP-specific PRB grid, which are the PRBs of the BWP, and which are a subset of the PRBs of the common PRB grid, depending on which sub-bands of the wideband channel that the BWP uses. Each sub-band and/or each BWP may have their own minimum guard band requirements, and BWPs of different sizes may have different guard band requirements. Thus, the size and location (e.g., on which sub-bands, or using which PRBs) of a BWP may change the required guard bands for the BWP. Thus, each BWP may use or include a set of PRBs (the BWP-specific PRB grid) for transmission/reception, and other PRBs within the wideband channel may be designated or configured as guard band PRBs, depending on the size and/or location of the BWP.

Thus, according to an example embodiment, various techniques are described to allow a wireless device (e.g., UE or another device) to determine a BWP-specific PRB grid, for at least one BWP. Once the set of PRBs for a BWP (BWP-specific PRB grid) have been determined or identified, these PRBs may be used by a UE (or other device) to transmit or to receive, if the BWP has been selected or configured for use.

Therefore, various example techniques may be employed, such as for example: In an example embodiment, a method may include determining, by a user equipment (UE) in a wireless network, a starting physical resource block (PRB) of a common physical resource block grid that is associated with a wideband channel, wherein a plurality of bandwidth parts (BWPs) are provided within the common physical resource block grid, each bandwidth part having a bandwidth that is less than the bandwidth of the wideband channel; determining, by the user equipment, a wideband channel guard band for the wideband channel, the wideband channel guard band provided between a lowest frequency of the wideband channel and a first usable physical resource block of the common physical resource block grid; and, determining, by the user equipment for at least one bandwidth part (BWP) of the plurality of bandwidth parts, a bandwidth part-specific physical resource block grid (BWP-specific PRB grid) that is a subset of the common physical resource block grid.

In an example embodiment, the starting physical resource block (e.g., which may be referred to herein as PointA) of a common physical resource block grid is determined by a physical resource block determined based on an absolute frequency or a relative frequency that is known by the user equipment or received in a message or signal by the user equipment from a base station.

In an example embodiment, the plurality of bandwidth parts may include at least a first temporal bandwidth part that is temporarily available for use by the user equipment for transmission or reception based on a positive clear channel assessment, performed by either the user equipment or a base station, for one or more sub-bands of the temporal bandwidth part; and at least a second bandwidth part that is unavailable for use by the user equipment for transmission or reception based on a negative clear channel assessment, performed by either the user equipment or the base station, for one or more sub-bands of the temporal bandwidth part.

The plurality of bandwidth parts may include at least a first temporal bandwidth part that is temporarily available for use by the user equipment based on a downlink transmission (e.g., synchronization signals or other signals), detected by the user equipment, on the temporal bandwidth part; and at least a second bandwidth part that is unavailable for use by the user equipment based on an absence of a downlink transmission on one or more sub-bands of the temporal bandwidth part. (e.g., a UE receiving signals on a BWP may indicate or configure the UE to transmit via the indicated BWP).

In an example embodiment, the user equipment may receive control information from a base station indicating one or more configured bandwidth parts that may be used by the user equipment, wherein each bandwidth part includes one or more sub-channels, wherein the user equipment further performs the following: performing a clear channel assessment (CCA) on one or more sub-channels of one or more of the configured bandwidth parts; and selecting a temporal bandwidth part that is temporarily available for use, of the one or more configured bandwidth parts, based on a positive result of the clear channel assessment of all of one or sub-channels of the selected temporal bandwidth part.

In an illustrative example, the wideband channel may include a plurality (e.g., 2, 3, 4, 5, . . . ) of 20 MHz sub-bands. The method may further include performing, by the user equipment, a clear channel assessment on sub-band(s) of one or more of the bandwidth parts before transmitting via the bandwidth part, wherein the clear channel assessment is performed per sub-band.

In an example embodiment, the determining, by the user equipment for at least one bandwidth part of the plurality of bandwidth parts, a bandwidth part-specific physical resource block grid may include: determining, by the UE, the bandwidth part-specific physical resource block grid for the at least one bandwidth part, for a current channel occupancy time; and wherein the at least one bandwidth part contains (includes) a subset of sub-bands defined by the wideband channel, wherein the at least one bandwidth part is used, by the user equipment, for reception of data or control information during the current channel occupancy time.

In an example embodiment, the determining, by the user equipment, a wideband channel guard band for the wideband channel may include: receiving, by the user equipment from a base station, information indicating the wideband channel guard band provided between the lowest frequency of the wideband channel and the first usable physical resource block of the common physical resource block grid.

In an example embodiment, the determining, by the user equipment, a wideband channel guard band for the wideband channel may include: determining a frequency of the starting physical resource block of the common physical resource block grid; determining further information, including a frequency spacing of sub-bands within the wideband channel and/or a frequency of a lowest edge of a sub-band where the starting physical resource block of the sub-band is located; and determining, by the user equipment, a wideband channel guard band for the wideband channel based on at least the frequency of the starting physical resource block of the common physical resource block grid and the further information.

In an example embodiment, the method may include controlling, by the user equipment, transmitting or receiving control information or data via the bandwidth part-specific physical resource block grid for the at least one bandwidth part.

In an example embodiment the determining, by the user equipment for at least one bandwidth part of the plurality of bandwidth parts, a bandwidth part-specific physical resource block grid may include: determining at least a lower edge or a lowest-frequency physical resource block of the bandwidth part-specific physical resource block grid for the at least one bandwidth part. For example, the determining at least a lower edge or a lowest-frequency physical resource block of the bandwidth part-specific physical resource block grid for the at least one bandwidth part may include: determining a first full physical resource block (PointB) of the common physical resource block grid that fulfills a minimum guard band requirement for the at least one bandwidth part.

In an example embodiment, the determining, by the user equipment for at least one bandwidth part of the plurality of bandwidth parts, a bandwidth part-specific physical resource block grid may include: determining at least an upper edge or a highest-frequency physical resource block of the bandwidth part-specific physical resource block grid for the at least one bandwidth part.

In an example embodiment, the determining at least an upper edge or a highest-frequency physical resource block of the bandwidth part-specific physical resource block grid for the at least one bandwidth part may include: determining a last full physical resource block (PointC) of the common physical resource block grid that fulfills a minimum guard band requirement for the at least one bandwidth part.

Thus, according to an example embodiment, a UE or other device may determine a BWP-specific PRB grid (or a set of PRBs for a specific BWP) by determining PointB and/or PointC, e.g., which may be (or identify) the first full PRB and last full PRB, respectively, of the BWP-specific PRB grid, for example. Thus, even though different BWPs within a wideband channel may have different sizes, different locations within the wideband channel and/or have different guard band requirements, a UE or other device may determine PointB and/or PointC to determine or identify the BWP-specific PRB grid for a BWP.

For example, a UE or other device may determine a first full physical resource block (PointB(n)), and/or a last full physical resource block (PointC(n)) of the common physical resource block grid that fulfills a minimum guard band requirement ($GB_{min}$) for an $n^{th}$ bandwidth part ($BWP_n$) based on one or more of the following parameters, by way of example: a sub-band bandwidth ($BW_{sb}$), wherein each of the bandwidth parts includes one or more sub-bands; a bandwidth part index (n) identifying the $n^{th}$ bandwidth part ($BWP_n$) of the plurality of bandwidth parts; a bandwidth ($BW_n$) of the $n^{th}$ bandwidth part, wherein the bandwidth ($BW_n$) of the $n^{th}$ bandwidth part ($BWP_n$) includes one or more sub-bands; a subcarrier spacing (SCS); a minimum guard band requirement ($GB_{min}$) for the $n^{th}$ bandwidth part ($BWP_n$); a size ($PRB_{size}$) of each of the physical resource blocks of the $n^{th}$ bandwidth part ($BWP_n$), expressed as a multiple of the subcarrier spacing (SCS); a sub-band index ($k_n$) of lowest sub-band contained on the $n^{th}$ bandwidth part ($BWP_n$); and/or a wideband channel guard band ($GB_{pointA}$). Some example equations are provided herein below that provide illustrative examples of how a UE or other device may determine PointB and/or PointC.

In an example embodiment, the last full physical resource block of the common physical resource block grid that fulfills a minimum guard band requirement ($GB_{min}$) for the $n^{th}$ bandwidth part is upper limited by at least one of the following: a number of physical resource blocks ($N_{RB}$) associated with a maximum bandwidth configuration of the wideband channel; and/or a number of physical resource blocks ($N_{RB}$ ($BW_n$)) associated with a bandwidth part-specific bandwidth.

In an example embodiment, the method may include performing, by the user equipment, a per sub-band clear channel assessment for one or more sub-bands within the wideband channel, wherein each sub-band being less than the bandwidth of the wideband channel; selecting, by the user equipment, the at least one bandwidth part that includes physical resource blocks of one or more sub-bands that passed a clear channel assessment; and controlling, by the user equipment, transmitting data via the bandwidth part-specific physical resource block grid for the selected at least one bandwidth part.

In an example embodiment, the method may include receiving, by the user equipment, a signaled resource allocation, as either as a downlink assignment or an uplink grant, wherein the resource allocation is the physical resource blocks of the bandwidth part-specific physical resource block grid.

In an example embodiment, the determining, by the user equipment, a bandwidth part-specific physical resource block grid for the at least one bandwidth part may include determining a bandwidth part-specific physical resource block grid for the at least one bandwidth part for a current channel occupancy time; and the method may further include controlling, by the user equipment, reception of data or control information during the current channel occupancy time via the bandwidth part-specific physical resource block grid for the at least one bandwidth part.

In an example embodiment, the plurality of bandwidth parts may include a plurality of nested bandwidth parts, wherein: the plurality of nested bandwidth parts include physical resource blocks provided within the common physical resource block grid; and at least a first bandwidth part having a first bandwidth overlaps and is provided as a subset of physical resource blocks with a second bandwidth part having a second bandwidth, wherein the second bandwidth is greater than the first bandwidth.

In an example embodiment, the method may include determining, by the user equipment, the minimum guard band requirement for the at least one bandwidth part based on a subcarrier spacing and the bandwidth of the at least bandwidth part.

According to an example embodiment, Table 5.3.2-1 (below) indicates maximum transmission bandwidth, $N_{RB}$ (a number of PRBs), for various combinations of UE channel bandwidth and SCS (subcarrier spacing). Also, Table 5.3.3-1 (below) indicates a minimum guard band for each UE channel bandwidth and SCS combination. These Tables are from 3GPP RAN4 TS38.101-1. If, for example the requirements of these two tables are applied to BWPs, these illustrate examples of maximum transmission bandwidth (maximum number of PRBs) and minimum guard bands that may be applied to different BWPs (e.g., BWPs of different sizes/bandwidths and/or different SCS). Thus, for example, a UE channel bandwidth (e.g., BWP bandwidth) of 20 MHz, at a SCS of 30 KHz would have a maximum transmission bandwidth of 51 PRBs, and a minimum guard band of 805 KHz. Thus, it can be seen, in these example Tables 5.3.2-1 and 5.3.3-1, that different UE bandwidths (e.g., which may be different BWP bandwidths) may have different maximum number of PRBs (maximum transmission bandwidth) and a different minimum guard band (minimum guard band also indicated as a number of PRBs). Thus, for example, for, e.g., dynamically allocated, or dynamically selected temporal BWPs, the UE may need to determine a different BWP-specific PRB grid for the temporal BWP, under various BWP bandwidths, locations (which sub-bands) and/or different SCS for the BWP. Table 5.3.2-1 and Table 5.3.3-1 are just examples of $N_{RB}$ and Minimum guard band that may be used, according to an example embodiment. Other tables or values may be provided or defined, e.g., for a different situation or scenario. For example, $N_{RB}$ values may increase and/or the minimum guard band values may increase, compared to these tables.

TABLE 5.3.2-1

Maximum transmission bandwidth configuration $N_{RB}$ (maximum transmission bandwidth is indicated as a number of physical resource blocks (PRBs)).

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

TABLE 5.3.3-1

Minimum guard band for each UE channel bandwidth and SCS (kHz)

| SCS (kHz) | 5 MHz | 10 MHz | 15 MHz | 20 MHz | 25 MHz | 30 MHz | 40 MHz | 50 MHz | 60 MHz | 80 MHz | 90 MHz | 100 MHz |
|---|---|---|---|---|---|---|---|---|---|---|---|---|
| 15 | 242.5 | 312.5 | 382.5 | 452.5 | 522.5 | 592.5 | 552.5 | 692.5 | N/A | N/A | N/A | N/A |
| 30 | 505 | 665 | 645 | 805 | 785 | 945 | 905 | 1045 | 825 | 925 | 885 | 845 |
| 60 | N/A | 1010 | 990 | 1330 | 1310 | 1290 | 1610 | 1570 | 1530 | 1450 | 1410 | 1370 |

Figure 2:
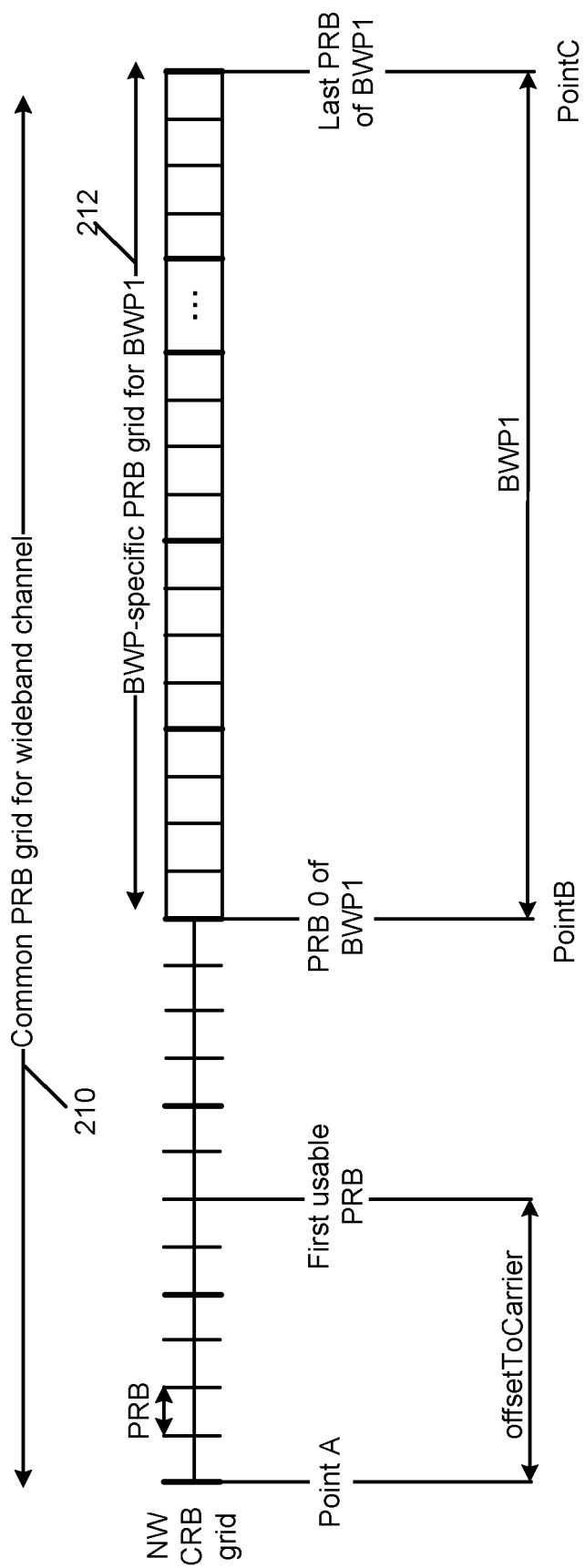
FIG. 2 is a diagram illustrating a bandwidth part (BWP) within a wideband channel according to an example embodiment.

FIG. 2 is a diagram illustrating a bandwidth part (BWP) within a wideband channel according to an example embodiment. An example of a common PRB grid 210 is shown for a wideband channel. Point A is indicated, e.g., the starting PRB of the common PRB grid 210. PointA, or the starting PRB of the common PRB grid, may be determined based on an absolute frequency or a relative frequency that is known by the UE or received in a message or signal by the UE from a base station or gNB. An absolute frequency may be the actual frequency that is indicated, while a relative frequency may be a frequency that is indicated relative to a base frequency or reference frequency (e.g., a relative frequency may be an offset frequency from a base or reference frequency). Thus, PointA may be indicated or determined based on a frequency, e.g., either an absolute frequency or a relative frequency (which may be provided with respect to a base or reference frequency).

FIG. 2 also indicates a first usable PRB of the common PRB grid. For example, the first usable PRB of the common PRB grid may be the first PRB of the common PRB grid that may be used or usable (e.g., within or as part of a BWP) for transmitting or receiving. For example, the first usable PRB of the common PRB grid may be a carrier offset (e.g., defined by a value shown as offsetToCarrier) from the PointA. Thus, for example, PointA may identify or determine the (e.g., beginning or first PRB of) common PRB grid 210. Alternatively, PointA may be referred to as the location of the first usable PRB of the common PRB grid 210. An example bandwidth part, BWP1, is shown, including the PRBs that are the BWP-specific PRB grid for BWP1 (212).

The first full physical resource block (PointB) and the last full physical resource block (PointC) of the common physical resource block grid 210 that fulfills a minimum guard band requirement ($GB_{min}$) for BWP1 are shown for the BWP1. A plurality of BWPs may be nested within the common PRB grid 210 starting at the first usable PRB. This is merely an illustrative example, and other arrangements or configurations may be used.

Figure 3:
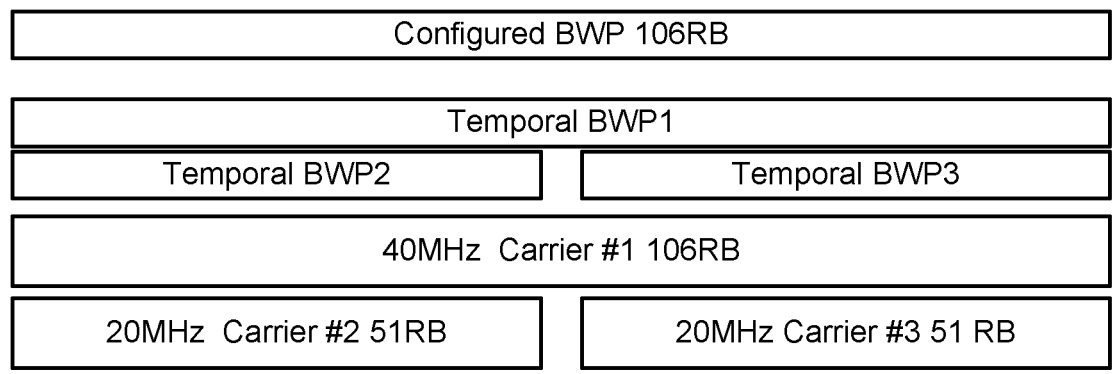
FIG. 3 is a diagram illustrating an example of a plurality of bandwidth parts according to an example embodiment.

FIG. 3 is a diagram illustrating an example of a plurality of bandwidth parts according to an example embodiment. In the illustrative example shown in FIG. 3, a 40 MHz bandwidth (106 PRBs) sub-channel (temporal BW1), and two 20 MHz sub-channels (51 PRBs each) including temporal BWP2 and temporal BWP3. A 5 PRB guard band 310 is provided between the 51 PRBs of temporal BWP2 and the 51 PRBs of temporal BWP3. Thus, this set of BWPs may include two 20 MHz (and 51 PRB) BWPs (temporal BWP2 and temporal BWP3), each of these two BWPs provided on a different 20 MHz sub-channel. Similarly, temporal BWP1 provides a 40 MHz bandwidth (106 PRBs), using both of these 20 MHz sub-channels. For example, the 40 MHz bandwidth of BWP1, and the two 20 MHz sub-channels used for BWP2 and BWP3, may be provided within a larger or wider wideband channel (e.g., 60 MHz, 80 MHz, 100 MHz, . . . ).

Figure 4:
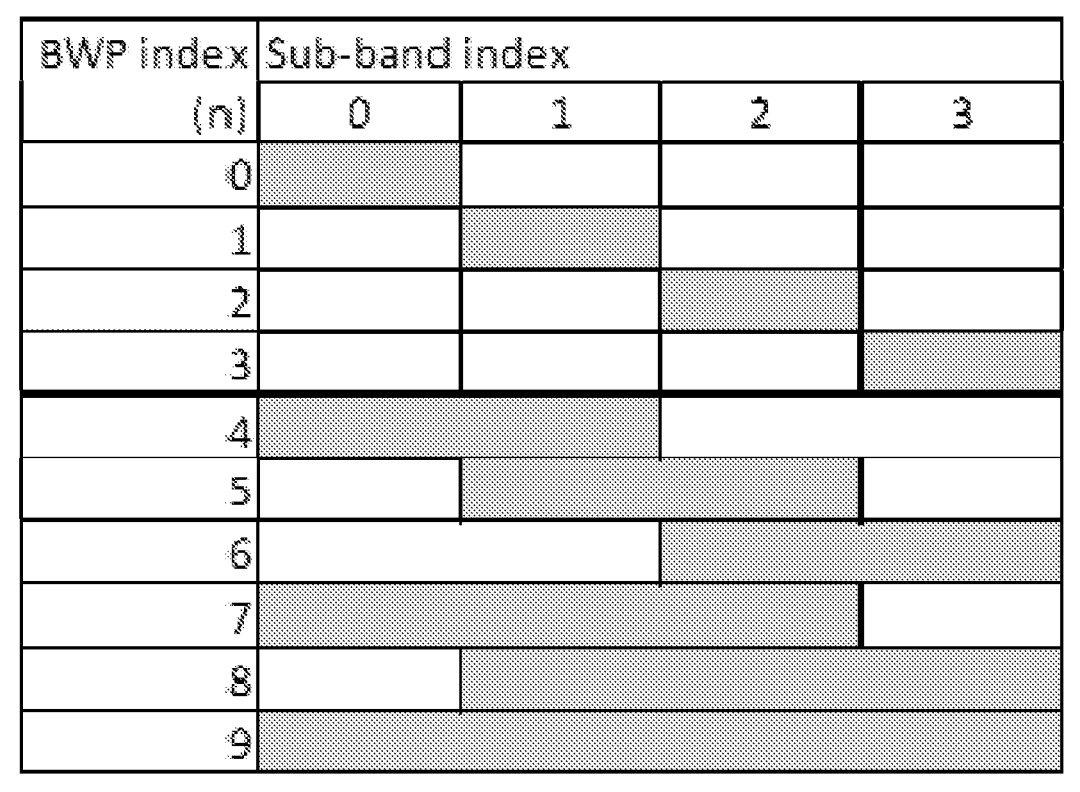

FIG. 4 is a diagram illustrating a plurality of bandwidth parts (BWPs) according to another example embodiment. In this illustrative example, there are 4 (e.g., 20 MHz) sub-bands, each identified by a sub-band index of 0, 1, 2, or 3. A BWP index (n) indicates the specific BWP of this set of BWPs. BWP(0) is a BWP that uses sub-band (0); BWP(1) uses sub-band (1); BWP(2) uses sub-band (2); BWP(3) uses sub-band (3). Thus, each of BWPs (0 . . . 3) are BWPs of one sub-band (e.g., 0.20 MHz) width, starting at a different location or sub-band. BWP(4) is a BWP that uses the contiguous sub-bands, sub-band(0) and sub-band(1); BWP (5) and BW(6) likewise have a width of two contiguous sub-bands. BW(7) and BW(8) each use three contiguous sub-bands. And BW(9) uses all 4 contiguous sub-bands. A BS or RAN node may indicate to a UE which BWPs are configured or allowed to be used, e.g., only BWPs (0 . . . 7).

The BWPs shown in FIG. 4 are nested within a wideband channel that includes a plurality of adjacent sub-bands, e.g., each 20 MHz. Some example techniques are described herein, e.g., including some equations, to allow a UE or other device to determine, for each of one or more BWPs, which PRBs are used out of the 80 MHz wideband channel, depending on the sub-bands that are used (which sub-bands have a successful LBT) for the BWP.

Some aspects or features of BWPs being nested, may include, for example:

At least some of the temporal BWPs are overlapping other temporal BWPs, such that, for at least some of the BWPs, a temporal BWP with a smaller bandwidth (BW) is overlapping with PRBs of a temporal BWP with a larger BW; and/or The BWPs share a common PRB grid.

Based on "nesting", PRBs of each temporal BWP are a subset of PRBs defined for a wideband carrier. Thus, for example, a BWP-specific PRB grid (for each or one or more of the BWPs) is a subset of or provided within the common PRB grid for the wideband channel.

According to an example embodiment, the nested BWPs may be described by different features or parameters. For example, a set of BWPs may be based on the following assumptions (by way of illustrative example): a carrier bandwidth (e.g. 80 MHz); number of contiguous sub-bands supported: [1 2 3 4]; sub-band bandwidth $BW_{sb}$ (e.g. 20 MHz, but may be configured or specified to be e.g. 40 MHz or other value). It is also possible to set limitations for the sub-band usage, for example in certain scenarios BWP options with 3 contiguous sub-bands are not used. In another embodiment, the allowed BWP combinations are indicated explicitly by higher layer signaling sent by a BS to the UE.

Tables 1 and 2 below describe further parameters that may describe BWPs, according to an example embodiment. Table 1 describes sub-band combination shown in FIG. 4, including three parameters n, $BW_n$, and $k_n$. The UE may determine these parameters based on the given (e.g., as determined by the UE, or as signalled by BS) BWP configuration.

TABLE 1

Parameters of temporal BWPs

| Parameter | Value |
|---|---|
| n | BWP index (indexed temporal BWP denoted also as BWP (n) n ∈ [0, 1, . . . , 9] (see FIG. 4) |
| $BW_n$ | Bandwidth of the $n^{th}$ BWP (temporal BWP) $BW_n$ ∈ [20, 40, 60, 80] MHz |
| $k_n$ | lowest sub-band of the $n^{th}$ BWP (temporal BWP) $k_n$ ∈ [0, 1, 2, 3] (see FIG. 4) (which may be the index of sub-band) |

Table 2 describes parameters related to (or that describe) the guard band for each BWP (or each BWP option). A temporal BWP may be or may include the bandwidth or PRBs available for transmitting or receiving in scenarios with sub-band specific listen-before-talk (LBT), according to an example embodiment. LBT in NR (New Radio/5G) operates with 20 MHz granularity at least in 5 GHz spectrum.

TABLE 2

Parameters to determine PRB raster (or spacing) for at least one temporal BWP

| Parameter | Value |
|---|---|
| $GB_{pointA}$ | Guard band for the carrier, kHz (this can be calculated e.g. as point A minus sub-band border) |
| $GB_{min}$ (BW, SCS) | Minimum guard band requirement (w.r.t. 20 MHz channel raster) for given BWP size defined separately for each subcarrier spacing (SCS) value. GBmin (BW, SCS) can be a two-dimensional table, where one dimension is BWP (e.g. 20, 40, 60, . . . ) and another dimension is SCS (e.g. 15 kHz, 30 kHz, 60 kHz). The table indicates the guard band (to be defined in RAN4), Example, 30 kHz SCS: $GB_{min}$ (20 MHz, 30 kHz) = 805 kHz $GB_{min}$ (40 MHz, 30 kHz) = 905 kHz $GB_{min}$ (60 MHz, 30 kHz) = 825 kHz $GB_{min}$ (80 MHz, 30 kHz) = 925 kHz Table 5.3.2-1 can be used (or used as the starting point) for determining $GB_{min}$ ($BW_n$, SCS) for different NR-U (New Radio unlicensed band) scenarios. On the other hand, the actual parameter values may change compared to Table 5.3.2-1. For example, unlicensed band scenario may be able to operate with smaller guard band compared to NR R15 licensed band scenario (due to relaxed spectrum emission mask). |
| $PRB_{size}$ | 12*SCS 180 kHz for 15 kHz SCS 360 kHz for 30 kHz SCS 720 kHz for 60 kHz SCS |
| common PRB grid | PRB grid for wideband channel-e.g., which may be determined based on point A (which defines start of common PRB grid) cprb ∈ [0, 1, 2, . . . ] |

Figure 5:
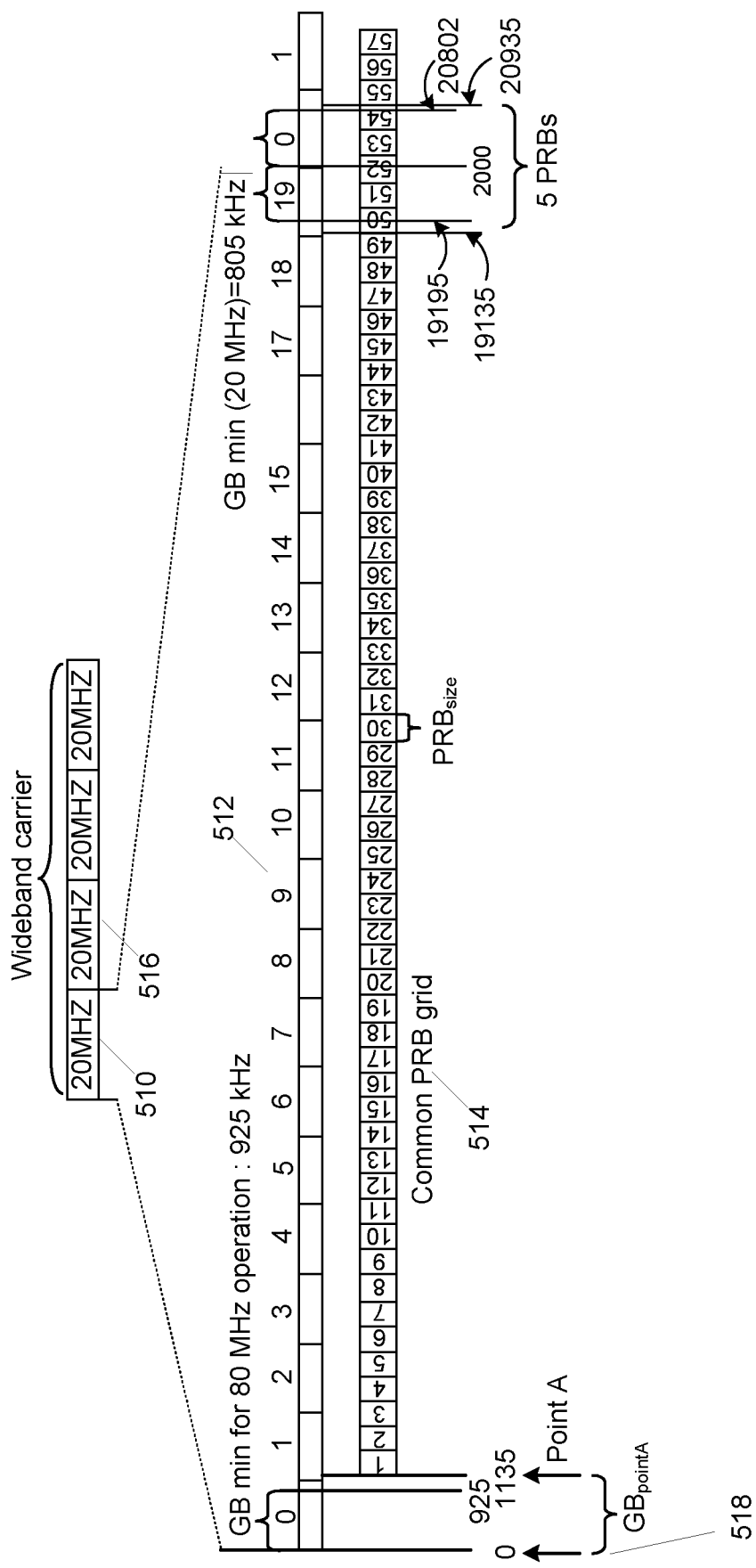
FIG. 5 is a diagram illustrating a portion of a common PRB grid according to an example embodiment.

FIG. 5 is a diagram illustrating a portion of a common PRB grid according to an example embodiment. As shown in FIG. 5, a wideband carrier may include 4 20 MHz sub-channels, including a first sub-channel 510. The 20 separate MHz sections (0-19) 512 are shown for sub-band 510. A portion of the common PRB grid 514 is shown, including PRBs [1-~52] for sub-band 510 and about PRBs 52-57, etc., for the second sub-band 516 PointA is shown for common PRB grid. Also, a wideband channel guard band ($GB_{pointA}$) is shown. The wideband channel guard band ($GB_{pointA}$) may be the wideband channel guard band provided between a lowest frequency (518) of the wideband channel and PointA, which coincides in this example with the first subcarrier of the first usable PRB. Or, alternatively, the wideband channel guard band ($GB_{pointA}$) may be the wideband channel guard band provided between a lowest frequency (518) of the wideband channel and the first usable physical resource block (520) of the common physical resource block grid (where the first usable physical resource block may be a carrier offset from PointA).

With reference to FIG. 5, $GB_{min}(BW_n, SCS)$ can be used to control the emissions (both in-band and out-of-band) in the considered scenario. The upper raster (shown as 512) shows the first sub-band in 1 MHz steps, then lower raster (shown as 514) is common PRB grid 514 starting at point A. Point A (also referred to as pointA) may vary from carrier to carrier; A BS or gNB may choose Point A (only certain values of Point A may be allowed).

Figure 6:
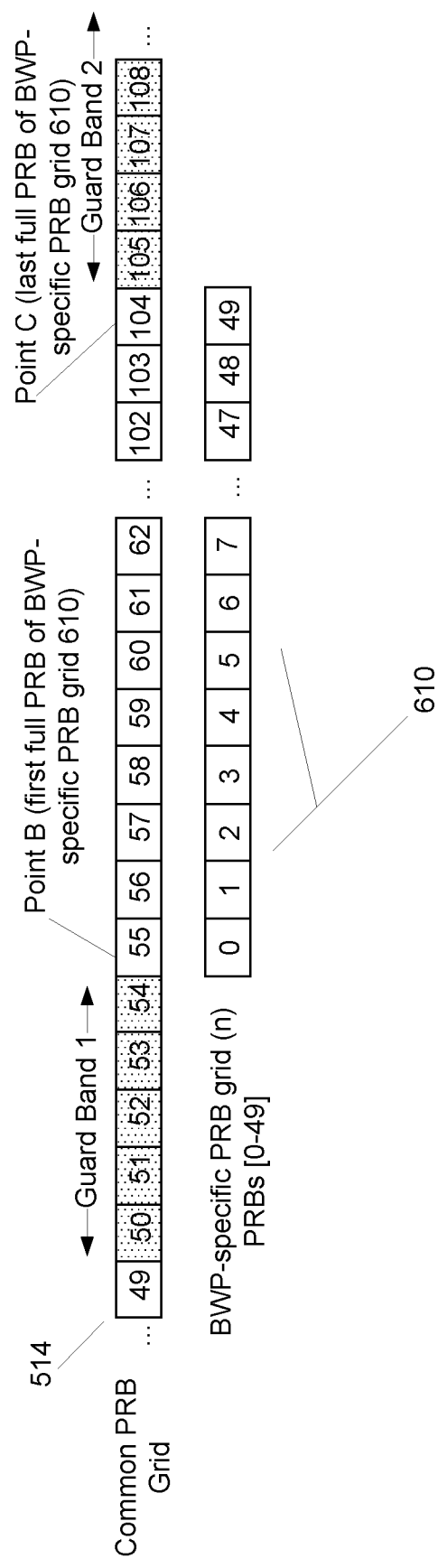
FIG. 6 is a diagram illustrating a bandwidth part (BWP)—specific PRB grid according to an example embodiment.

FIG. 6 is a diagram illustrating a bandwidth part (BWP)—specific PRB grid according to an example embodiment. As shown in FIG. 6, a portion of the common PRB grid 514 is shown, including PRBs [49-108]. Within the common PRB grid 514, a BWP-specific PRB grid 610 is shown, including PRBs 55-104 of the common PRB grid 514. Thus, BWP-specific PRB grid 610 includes PRBs [0-49], which are the PRBs [55-104] of the common PRB grid 514. Two 5-PRB guard bands are shown, including a guard band 1 (provided before the BWP-specific PRB grid 610) that includes PRBs [50-54], and a guard band 2 (provided after the BWP-specific PRB grid 610) that includes at least PRBs 105-108 of the common PRB grid 514.

There are at least two options to determine $GB_{pointA}$ for certain value of point A:

Option 1: UE determines implicitly based on point A:

UE knows the absolute frequency position of Point A; UE knows also the sub-band raster (sub-band spacing, e.g., 20 MHz) of the wideband carrier (and more specifically, the frequency of the lowest border/edge of the sub-band where the point A is located); and, based on those, the UE can determine $GB_{pointA}$ for the given wideband carrier.

Option 2: UE receives $GB_{pointA}$ via higher layer signaling. Determining Point B and Point C for Each Temporal BWP Option:

An aspect may be to provide carrier grid definition, or BWP-specific PRB grid, for each nested (or temporal) BWP option. In an example embodiment of the proposed solution, the PRB grid for each temporal BWP option may be determined by a UE, e.g., based on PointA and other related parameters. Also, for example, the BWP-specific PRB grid for a BWP may be determined, for example, based on parameters PointB and/or PointC.

PointB(n) and PointC(n) determine the PRB grid for sub-band-based operation (and to also maintain guard bands between different sub-bands assigned to a UE). There are no GBs between sub-bands within a temporal BWP (they use those GB PRBs within temporal BWP). In an embodiment PointB(n)/PointC(n) corresponds to the common PRB (cprb) defining the first/last valid PRB of the BWP(n). A benefit of this approach is that resource allocation field in scheduling DCI can be reduced according to the actual PRB grid.

In an illustrative example, PointB and PointC may be defined based on equations.

Figure 7:
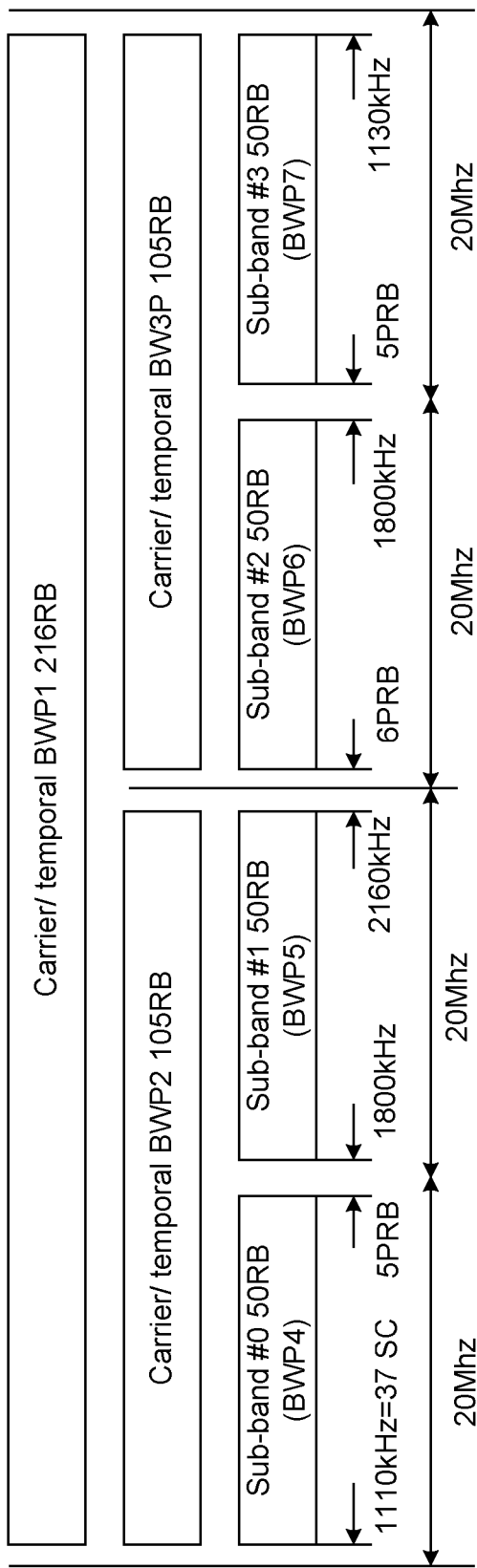
FIG. 7 is a diagram illustrating a plurality of bandwidth parts (BWPs) according to an example embodiment.

FIG. 7 is a diagram illustrating a plurality of bandwidth parts (BWPs) according to an example embodiment. BWP1 may include, e.g., 216 PRBs, and may span four 20 MHz sub-bands. BWP2 and BWP3 may include 105 PRBs each and may each span two 20 MHz sub-bands. A 6 PRB guard band is provided between BWP2 and BWP3. Likewise, BWP4, BWP5, BWP6 and BWP7 may each include 50 PRBs, and span one sub-band. Due to different sub-band requirements for 20 MHz and 40 MHz channels as well as other parameters, the BWP4 and BWP5 are separated by a 5 PRB guard band, and BWP6 and BWP are separated by a 5 PRB guard band. Noted above, a 6 PRB guard band separates BWP2 (40 MHz) from BWP3 (40 MHz). FIG. 7 illustrates an example embodiment. For example, the number of PRBs per each BWP and guard band may vary according to one or more parameters (such as PointA and guard band, or other parameters). Another approach is to determine the BWP-specific PRB grid (e.g., the grid of allowed PRBs of PRB(n) for a BWP) by determining PointB and/or PointC. When following this option resource assignment is still based on common PRB grid (cprb), but UE considers scheduling outside PointB/PointC as invalid resource allocation.

It should be appreciated that UE may determine PointB(n) as the first full PRB on the common PRB grid fulfilling the minimum guard band requirement $GB_{min}(BW_n, SCS)$.

It can be determined based on Eqn. 1 below.

$$PointB(n) = \max\left(\left\lceil \frac{1000 * BW_{sb} * k_n + GBmin(BW_n, SCS) - GB_{PointA}}{PRB_{size}} \right\rceil, 0\right) \quad \text{(Eqn. 1)}$$

The definitions for the parameters can be found above in Tables 1 and 2, where "max( )" term may be needed to ensure that sub-band specific pointA is always within the common PRB grid and $BW_{sb}$ is the sub-band bandwidth. In some embodiments, "max( )" term may not be needed. PointC(n) may be determined as the last full PRB on the common PRB grid fulfilling the minimum guard band requirement $GB_{min}(BW_n, SCS)$. PointC can be determined based on Eqn. 2.

$$PointC(n) = \left\lfloor \frac{1000 * (BW_{sb} * k_n + BW_n) - GBmin(BW_n, SCS) - GB_{PointA}}{PRB_{size}} \right\rfloor - 1 \quad \text{(Eqn. 2)}$$

In an embodiment, PointC (n) may be upper limited by the maximum bandwidth configuration of the carrier ($N_{RB}$) In this case the equation (Eqn. 2) can be written in the following form:

$$PointC(n) = \min\left(\left(\left\lfloor \frac{1000 * (BW_{sb} * k_n + BW_n) - GBmin(BW_n, SCS) - GB_{PointA}}{PRB_{size}} \right\rfloor - 1\right), (N_{RB} - 1)\right)$$

The definitions for the parameters can be found above in Tables 1 and 2. SCS-specific values shown in Table 5.3.2-1 may, for example, be used for determining $N_{RB}$ In another embodiment, PointC(n) is upper limited by the BWP-specific value $N_{RB}(BW_n)$. This enables a scenario with equal number of PRBs for each BWP of the same size.

Table 2 below implements am example determination for PointB, PointC for the BWP(n). The following parameters may be varied from BWP to BWP:

SCS: [15, 30, 60] kHz;

$BW_n$: [20, 40, 60, 80] MHz;

$GB_{pointA}$ based on point A (1110);

$GB_{min}$ based on guard band requirement for the given PBW size (805 KHz); and Sub-band bandwidth $BW_{sb}$: [20 MHz].

| SCS | | | 30 khz | |
| GBpointA | | | 1110 khz | |
| Gbmin | | | 805 khz | |
| $BW_n$ | | | 20 MHz | |
| PRBsize | | | 360 kHz | |
| $BW_{sb}$ | | | 20 MHz | |
| lowest subband | 0 | 1 | 2 | 3 |
| PointB nominator | −305 | 19695 | 39695 | 59695 |
| Point B quotient | −0.84722 | 54.70833 | 110.2639 | 165.8194 |
| Point B | 0 | 55 | 111 | 166 |
| PointC nominator | 18085 | 38085 | 58085 | 78085 |
| Point C quotient | 50.23611 | 105.7917 | 161.3472 | 216.9028 |
| Point C | 49 | 104 | 160 | 215 |
| Number of PRBs | 50 | 50 | 50 | 50 |
| Guard band | | 5 | 6 | 5 |

Above definition indicated in Table 2 provides a regular structure, where carriers/temporal BWPs(n), corresponding to same $BW_n$ may include a same number of PRBs. As a consequence, resource allocation may operate on the wideband 80 MHz BWP, and guard-band PRBs and unsuccessful LBT sub-band's PRBs may be treated as invalid. The above example arrangement is illustrated in FIG. 6.

One or More Example Advantages

The techniques described herein allow a UE or other device to determine a BWP-specific PRB grid, e.g., based on a plurality of (e.g., nested) BWPs, which may be at least partially overlapping and may share the same common PRB grid used by the wideband channel;
- The PRB grid for each BWP option can be determined autonomously based on PointA and other related parameters. Point A determination can be kept unchanged compared to NR Rel-15 (NR release 15);
- Depending on the implementation option used, NR-U carrier/temporal BWP configuration can be done with very small (or even without) additional configuration signaling.
- Total bandwidth (BW) occupancy is the same for different sub-band combinations (4×20, 2×40, 3×20+20 1×80), i.e., carriers may be nested.
- The use, in at least some case of a nested property is beneficial, because it reduces the configuration overhead of carriers in NRU, only the beginnings of sub-bands need to be configured to UE. The PRB grid for temporal BWPs are then implicitly defined.
- There is no spectrum efficiency loss: in some cases, all PRBs of the PRBs which are achievable based on guard band definition can be used (if needed). On the other hand, the gNB may want to have the same number of PRBs for each BWP of the same size. This can easily be done based on network implementation.
- In-band emissions can be controlled by a single set of parameters determined by $GB_{min}(BW_n, SCS)$.
- Carriers are on the same PRB-grid, the guard-bands are full PRBs, inner guard-band can be then allocated if temporal BWP is larger than 20 MHz based on LBT.

Figure 8:
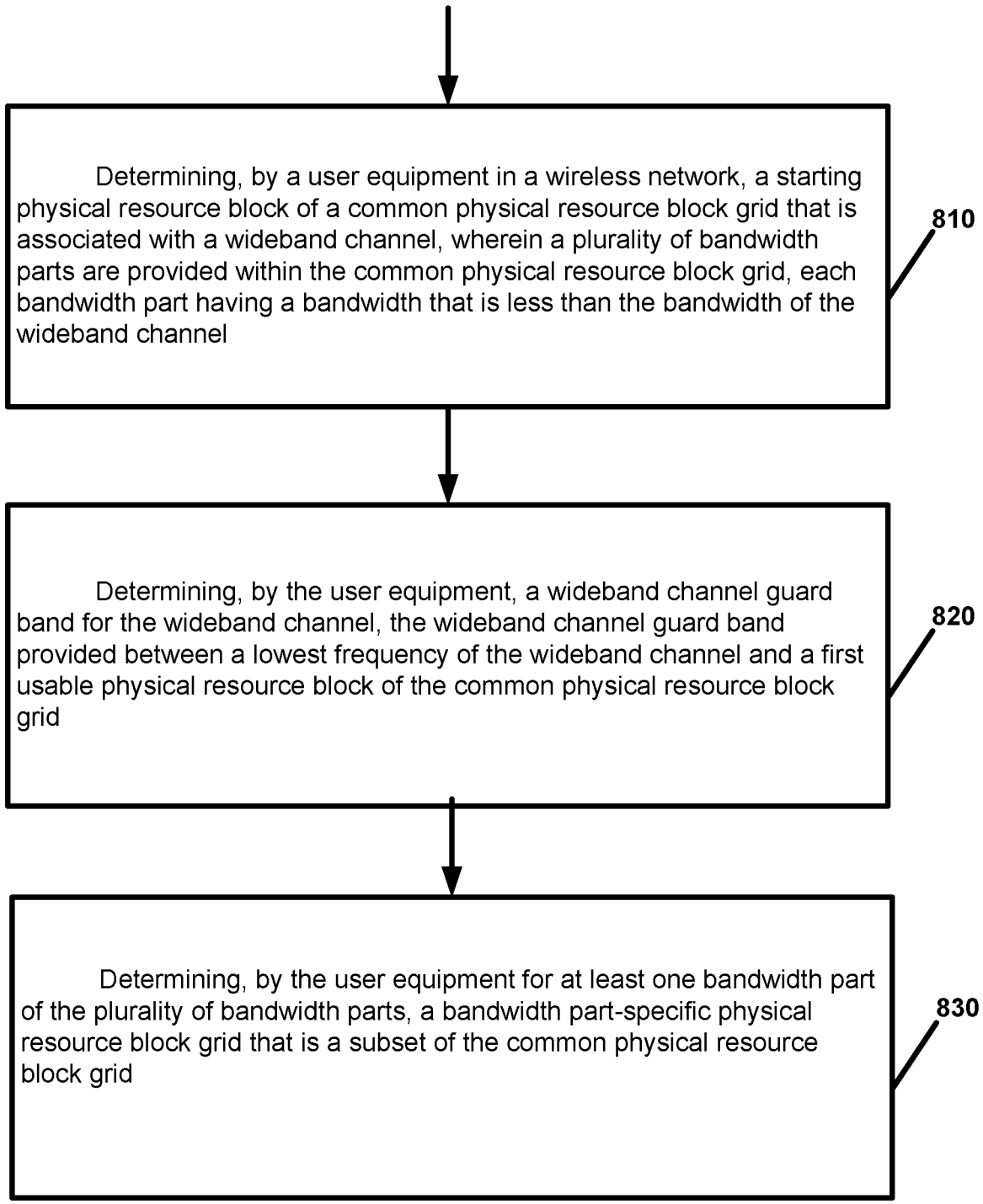
FIG. 8 is a flow chart illustrating operation of a user equipment according to an example embodiment.

Example 1. FIG. 8 is a flow chart illustrating operation of a user equipment (UE) according to an example embodiment. Operation 810 includes determining, by a user equipment in a wireless network, a starting physical resource block of a common physical resource block grid that is associated with a wideband channel, wherein a plurality of bandwidth parts is provided within the common physical resource block grid, each bandwidth part having a bandwidth that is less than the bandwidth of the wideband channel. Operation 820 includes determining, by the user equipment, a wideband channel guard band for the wideband channel, the wideband channel guard band provided between a lowest frequency of the wideband channel and a first usable physical resource block of the common physical resource block grid. And, operation 830 includes determining, by the user equipment for at least one bandwidth part of the plurality of bandwidth parts, a bandwidth part-specific physical resource block grid that is a subset of the common physical resource block grid.

Example 2. The method of example 1 wherein the first usable physical resource block of the common physical resource block grid is a frequency offset or carrier offset from the starting physical resource block of the common physical resource block grid.

Example 3. The method of any of examples 1-2 wherein the starting physical resource block of a common physical resource block grid is determined based on an absolute frequency or a relative frequency that is known by the user equipment or received in a message or signal by the user equipment from a base station.

Example 4. The method of any of examples 1-3 wherein the plurality of bandwidth parts comprise: at least a first temporal bandwidth part that is temporarily available for use by the user equipment for transmission or reception based on a positive clear channel assessment, performed by either the user equipment or a base station, for one or more sub-bands of the temporal bandwidth part; and at least a second bandwidth part that is unavailable for use by the user equipment for transmission or reception based on a negative clear channel assessment, performed by either the user equipment or the base station, for one or more sub-bands of the temporal bandwidth part.

Example 5. The method of any of examples 1-4 wherein the plurality of bandwidth parts comprise: at least a first temporal bandwidth part that is temporarily available for use by the user equipment based on a downlink transmission, detected by the user equipment, on the temporal bandwidth part; and at least a second bandwidth part that is unavailable for use by the user equipment based on an absence of a downlink transmission on one or more sub-bands of the temporal bandwidth part.

Example 6. The method of any of examples 1-5, wherein the user equipment receives control information from a base station indicating one or more configured bandwidth parts that may be used by the user equipment, wherein each bandwidth part includes one or more sub-channels, wherein the user equipment further performs the following: performing a clear channel assessment on one or more sub-channels of one or more of the configured bandwidth parts; and selecting a temporal bandwidth part that is temporarily available for use, of the one or more configured bandwidth parts, based on a positive result of the clear channel assessment of all of one or sub-channels of the selected temporal bandwidth part.

Example 7. The method of any of examples 1-6 wherein: the wideband channel comprises a plurality of 20 MHz sub-bands; the method further comprising: performing, by the user equipment, a clear channel assessment on sub-band(s) of one or more of the bandwidth parts before transmitting via the bandwidth part, wherein the clear channel assessment is performed per sub-band.

Example 8. The method of any of examples 1-7, wherein the determining, by the user equipment for at least one bandwidth part of the plurality of bandwidth parts, a bandwidth part-specific physical resource block grid comprises:

determining, by the UE, the bandwidth part-specific physical resource block grid for the at least one bandwidth part, for a current channel occupancy time; and wherein the at least one bandwidth part contains a subset of sub-bands defined by the wideband channel, wherein the at least one bandwidth part is used, by the user equipment, for reception of data or control information during the current channel occupancy time.

Example 9. The method of any of examples 1-8 wherein the determining, by the user equipment, a wideband channel guard band for the wideband channel comprises: receiving, by the user equipment from a base station, information indicating the wideband channel guard band provided between the lowest frequency of the wideband channel and the first usable physical resource block of the common physical resource block grid.

Example 10. The method of any of examples 1-9 wherein the determining, by the user equipment, a wideband channel guard band for the wideband channel comprises: determining a frequency of the starting physical resource block of the common physical resource block grid; determining further information, including a frequency spacing of sub-bands within the wideband channel and/or a frequency of a lowest edge of a sub-band where the starting physical resource block of the sub-band is located; and determining, by the user equipment, a wideband channel guard band for the wideband channel based on at least the frequency of the starting physical resource block of the common physical resource block grid and the further information.

Example 11. The method of any of examples 1-10, further comprising: controlling, by the user equipment, transmitting or receiving control information or data via the bandwidth part-specific physical resource block grid for the at least one bandwidth part.

Example 12. The method of any of examples 1-11 wherein the determining, by the user equipment for at least one bandwidth part of the plurality of bandwidth parts, a bandwidth part-specific physical resource block grid comprises: determining at least a lower edge or a lowest-frequency physical resource block of the bandwidth part-specific physical resource block grid for the at least one bandwidth part.

Example 13. The method of example 12 wherein the determining at least a lower edge or a lowest-frequency physical resource block of the bandwidth part-specific physical resource block grid for the at least one bandwidth part comprises: determining a first full physical resource block of the common physical resource block grid that fulfills a minimum guard band requirement for the at least one bandwidth part.

Example 14. The method of example 13 wherein the determining a first full physical resource block of the common physical resource block grid that fulfills a minimum guard band requirement for the at least one bandwidth part comprises: determining a first full physical resource block (PointB(n)) of the common physical resource block grid that fulfills a minimum guard band requirement ($GB_{min}$) for an $n^{th}$ bandwidth part ($BWP_n$) based on one or more of the following parameters: a sub-band bandwidth ($BW_{sb}$), wherein each of the bandwidth parts includes one or more sub-bands; a bandwidth part index (n) identifying the $n^{th}$ bandwidth part ($BWP_n$) of the plurality of bandwidth parts; a bandwidth ($BW_n$) of the $n^{th}$ bandwidth part, wherein the bandwidth ($BW_n$) of the $n^{th}$ bandwidth part ($BWP_n$) includes one or more sub-bands; a subcarrier spacing (SCS); a minimum guard band requirement ($GB_{min}$) for the $n^{th}$ bandwidth part ($BWP_n$); a size ($PRB_{size}$) of each of the physical resource blocks of the $n^{th}$ bandwidth part ($BWP_n$), expressed as a multiple of the subcarrier spacing (SCS); a sub-band index ($k_n$) of lowest sub-band contained on the $n^{th}$ bandwidth part ($BWP_n$); and/or a wideband channel guard band ($GB_{pointA}$).

Example 15. The method of example 14 wherein the determining a first full physical resource block (PointB(n)) of the common physical resource block grid that fulfills a minimum guard band requirement ($GB_{min}$) for the $n^{th}$ bandwidth part ($BWP_n$) is based on the following:

$$PointB(n) = \max\left(\left\lceil \frac{1000 * BW_{sb} * k_n + GB\min(BW_n, SCS) - GB_{PointA}}{PRB_{size}} \right\rceil, 0\right)$$

Example 16. The method of any of examples 1-15 wherein the determining, by the user equipment for at least one bandwidth part of the plurality of bandwidth parts, a bandwidth part-specific physical resource block grid comprises: determining at least an upper edge or a highest-frequency physical resource block of the bandwidth part-specific physical resource block grid for the at least one bandwidth part.

Example 17. The method of example 16 wherein the determining at least an upper edge or a highest-frequency physical resource block of the bandwidth part-specific physical resource block grid for the at least one bandwidth part comprises: determining a last full physical resource block of the common physical resource block grid that fulfills a minimum guard band requirement for the at least one bandwidth part.

Example 18. The method of example 17 wherein the determining a last full physical resource block of the common physical resource block grid that fulfills a minimum guard band requirement for the at least one bandwidth part comprises: determining a last full physical resource block (PointC(n)) of the common physical resource block grid that fulfills a minimum guard band requirement ($GB_{min}$) for an $n^{th}$ bandwidth part ($BWP_n$) based on one or more of the following parameters: a sub-band bandwidth ($BW_{sb}$), wherein each of the bandwidth parts includes one or more sub-bands; a bandwidth part index (n) identifying the $n^{th}$ bandwidth part ($BWP_n$) of the plurality of bandwidth parts; a bandwidth ($BW_n$) of the $n^{th}$ bandwidth part ($BWP_n$), wherein the bandwidth ($BW_n$) of the $n^{th}$ bandwidth part ($BWP_n$) includes one or more sub-bands; a subcarrier spacing (SCS); a minimum guard band requirement ($GB_{min}$) for the $n^{th}$ bandwidth part ($BWP_n$); a size ($PRB_{size}$) of each of the physical resource blocks of the $n^{th}$ bandwidth part ($BWP_n$), expressed as a multiple of the subcarrier spacing (SCS); a sub-band index ($k_n$) of lowest sub-band contained on the $n^{th}$ bandwidth part ($BWP_n$); and a wideband channel guard band ($GB_{pointA}$).

Example 19. The method of example 18 wherein the determining a last full physical resource block of the common physical resource block grid that fulfills a minimum guard band requirement ($GB_{min}$) for the $n^{th}$ bandwidth part is based on the following:

$$PointC(n) = \left\lfloor \frac{1000 * (BW_{sb} * k_n + BW_n) - GB\min(BW_n, SCS) - GB_{PointA}}{PRB_{size}} \right\rfloor - 1$$

Example 20. The method of any of examples 17-19, wherein the last full physical resource block of the common physical resource block grid that fulfills a minimum guard band requirement ($GB_{min}$) for the $n^{th}$ bandwidth part is upper limited by at least one of the following: a number of physical resource blocks ($N_{RB}$) associated with a maximum bandwidth configuration of the wideband channel; and/or a number of physical resource blocks ($N_{RB}(BW_n)$) associated with a bandwidth part-specific bandwidth.

Example 21. The method of any of examples 1-20, further comprising: performing, by the user equipment, a per sub-band clear channel assessment for one or more sub-bands within the wideband channel, wherein each sub-band being less than the bandwidth of the wideband channel; selecting, by the user equipment, the at least one bandwidth part that includes physical resource blocks of one or more sub-bands that passed a clear channel assessment; and controlling, by the user equipment, transmitting data via the bandwidth part-specific physical resource block grid for the selected at least one bandwidth part.

Example 22. The method of any of examples 1-21, further comprising: receiving, by the user equipment, a signaled resource allocation, as either as a downlink assignment or an uplink grant, wherein the resource allocation is the physical resource blocks of the bandwidth part-specific physical resource block grid.

Example 23. The method of any of examples 1-22, wherein the determining, by the user equipment, a bandwidth part-specific physical resource block grid for the at least one bandwidth part comprises determining a bandwidth part-specific physical resource block grid for the at least one bandwidth part for a current channel occupancy time; and the method further comprising controlling, by the user equipment, reception of data or control information during the current channel occupancy time via the bandwidth part-specific physical resource block grid for the at least one bandwidth part.

Example 24. The method of any of examples 1-23, wherein the plurality of bandwidth parts comprise a plurality of nested bandwidth parts, wherein: the plurality of nested bandwidth parts include physical resource blocks provided within the common physical resource block grid; and at least a first bandwidth part having a first bandwidth overlaps and is provided as a subset of physical resource blocks with a second bandwidth part having a second bandwidth, wherein the second bandwidth is greater than the first bandwidth.

Example 25. The method of any of examples 1-24, further comprising: determining, by the user equipment, the minimum guard band requirement for the at least one bandwidth part based on a subcarrier spacing and the bandwidth of the at least bandwidth part.

Example 26. An apparatus comprising means for performing the method of any of examples 1-25.

Example 27. A non-transitory computer-readable storage medium comprising instructions stored thereon that, when executed by at least one processor, are configured to cause a computing system to perform the method of any of examples 1-25.

Example 28. An apparatus comprising: at least one processor; and at least one memory including computer program code; the at least one memory and the computer program code configured to, with the at least one processor, cause the apparatus at least to perform the method of any of examples 1-25.

Example 29. An apparatus comprising: at least one processor; and at least one memory including computer program code; the at least one memory and the computer program code configured to, with the at least one processor, cause the apparatus at least to: determine, by a user equipment in a wireless network, a starting physical resource block of a common physical resource block grid that is associated with a wideband channel, wherein a plurality of bandwidth parts are provided within the common physical resource block grid, each bandwidth part having a bandwidth that is less than the bandwidth of the wideband channel; determine, by the user equipment, a wideband channel guard band for the wideband channel, the wideband channel guard band provided between a lowest frequency of the wideband channel and a first usable physical resource block of the common physical resource block grid; and determine, by the user equipment for at least one bandwidth part of the plurality of bandwidth parts, a bandwidth part-specific physical resource block grid that is a subset of the common physical resource block grid.

Example 30. The apparatus of example 29 wherein the first usable physical resource block of the common physical resource block grid is a frequency offset or carrier offset from the starting physical resource block of the common physical resource block grid.

Example 31. The apparatus of any of examples 29-30 wherein the starting physical resource block of a common physical resource block grid is determined based on an absolute frequency or a relative frequency that is known by the user equipment or received in a message or signal by the user equipment from a base station.

Example 32. The apparatus of any of examples 29-31 wherein the plurality of bandwidth parts comprise: at least a first temporal bandwidth part that is temporarily available for use by the user equipment for transmission or reception based on a positive clear channel assessment, performed by either the user equipment or a base station, for one or more sub-bands of the temporal bandwidth part; and at least a second bandwidth part that is unavailable for use by the user equipment for transmission or reception based on a negative clear channel assessment, performed by either the user equipment or the base station, for one or more sub-bands of the temporal bandwidth part.

Example 33. The apparatus of any of examples 29-32 wherein the plurality of bandwidth parts comprise: at least a first temporal bandwidth part that is temporarily available for use by the user equipment based on a downlink transmission, detected by the user equipment, on the temporal bandwidth part; and at least a second bandwidth part that is unavailable for use by the user equipment based on an absence of a downlink transmission on one or more sub-bands of the temporal bandwidth part.

Example 34. The apparatus of any of examples 29-33, wherein the user equipment is configured to receive control information from a base station indicating one or more configured bandwidth parts that may be used by the user equipment, wherein each bandwidth part includes one or more sub-channels, wherein the user equipment is further configured to perform the following: perform a clear channel assessment on one or more sub-channels of one or more of the configured bandwidth parts; and select a temporal bandwidth part that is temporarily available for use, of the one or more configured bandwidth parts, based on a positive result of the clear channel assessment of all of one or sub-channels of the selected temporal bandwidth part.

Example 35. The apparatus of any of examples 29-34, wherein: the wideband channel comprises a plurality of 20 MHz sub-bands; the apparatus further configured to: perform, by the user equipment, a clear channel assessment on sub-band(s) of one or more of the bandwidth parts before transmitting via the bandwidth part, wherein the clear channel assessment is performed per sub-band.

Example 36. The apparatus of any of examples 29-35, wherein causing the apparatus to determine, by the user equipment for at least one bandwidth part of the plurality of bandwidth parts, a bandwidth part-specific physical resource block grid comprises the apparatus to: determine, by the UE, the bandwidth part-specific physical resource block grid for the at least one bandwidth part, for a current channel occupancy time; and wherein the at least one bandwidth part contains a subset of sub-bands defined by the wideband channel, wherein the at least one bandwidth part is used, by the user equipment, for reception of data or control information during the current channel occupancy time.

Example 37. The apparatus of any of examples 29-36, wherein causing the apparatus to determine, by the user equipment, a wideband channel guard band for the wideband channel comprises causing the apparatus to: receive, by the user equipment from a base station, information indicating the wideband channel guard band provided between the lowest frequency of the wideband channel and the first usable physical resource block of the common physical resource block grid.

Example 38. The apparatus of any of examples 29-37, wherein causing the apparatus to determine, by the user equipment, a wideband channel guard band for the wideband channel comprises causing the apparatus to: determine a frequency of the starting physical resource block of the common physical resource block grid; determine further information, including a frequency spacing of sub-bands within the wideband channel and/or a frequency of a lowest edge of a sub-band where the starting physical resource block of the sub-band is located; and determine, by the user equipment, a wideband channel guard band for the wideband channel based on at least the frequency of the starting physical resource block of the common physical resource block grid and the further information.

Example 39. The apparatus of any of examples 29-38, further causing the apparatus to: control, by the user equipment, transmitting or receiving control information or data via the bandwidth part-specific physical resource block grid for the at least one bandwidth part.

Example 40. The apparatus of any of examples 29-39, wherein causing the apparatus to determine, by the user equipment for at least one bandwidth part of the plurality of bandwidth parts, a bandwidth part-specific physical resource block grid comprises causing the apparatus to:

determine at least a lower edge or a lowest-frequency physical resource block of the bandwidth part-specific physical resource block grid for the at least one bandwidth part.

Example 41. The apparatus of example 40 wherein causing the apparatus to determine at least a lower edge or a lowest-frequency physical resource block of the bandwidth part-specific physical resource block grid for the at least one bandwidth part comprises causing the apparatus to: determine a first full physical resource block of the common physical resource block grid that fulfills a minimum guard band requirement for the at least one bandwidth part.

Example 42. The apparatus of example 41 wherein causing the apparatus to determine a first full physical resource block of the common physical resource block grid that fulfills a minimum guard band requirement for the at least one bandwidth part comprises causing the apparatus to: determine a first full physical resource block (PointB(n)) of the common physical resource block grid that fulfills a minimum guard band requirement ($GB_{min}$) for an $n^{th}$ bandwidth part ($BWP_n$) based on one or more of the following parameters: a sub-band bandwidth ($BW_{sb}$), wherein each of the bandwidth parts includes one or more sub-bands; a bandwidth part index (n) identifying the $n^{th}$ bandwidth part ($BWP_n$) of the plurality of bandwidth parts; a bandwidth ($BW_n$) of the $n^{th}$ bandwidth part, wherein the bandwidth ($BW_n$) of the $n^{th}$ bandwidth part ($BWP_n$) includes one or more sub-bands; a subcarrier spacing (SCS); a minimum guard band requirement ($GB_{min}$) for the $n^{th}$ bandwidth part ($BWP_n$); a size ($PRB_{size}$) of each of the physical resource blocks of the $n^{th}$ bandwidth part ($BWP_n$), expressed as a multiple of the subcarrier spacing (SCS); a sub-band index ($k_n$) of lowest sub-band contained on the $n^{th}$ bandwidth part ($BWP_n$); and/or a wideband channel guard band ($GB_{pointA}$).

Example 43. The apparatus of example 42 wherein causing the apparatus to determine a first full physical resource block (PointB(n)) of the common physical resource block grid that fulfills a minimum guard band requirement ($GB_{min}$) for the $n^{th}$ bandwidth part ($BWP_n$) is based on the following:

$$PointB(n) = \max\left(\left\lceil \frac{1000 * BW_{sb} * k_n + GB\min(BW_n, SCS) - GB_{PointA}}{PRB_{size}} \right\rceil, 0\right)$$

Example 44. The apparatus of any of examples 29-43 wherein causing the apparatus to determine, by the user equipment for at least one bandwidth part of the plurality of bandwidth parts, a bandwidth part-specific physical resource block grid comprises causing the apparatus to: determine at least an upper edge or a highest-frequency physical resource block of the bandwidth part-specific physical resource block grid for the at least one bandwidth part.

Example 45. The apparatus of example 44 wherein causing the apparatus to determine at least an upper edge or a highest-frequency physical resource block of the bandwidth part-specific physical resource block grid for the at least one bandwidth part comprises causing the apparatus to: determine a last full physical resource block of the common physical resource block grid that fulfills a minimum guard band requirement for the at least one bandwidth part.

Example 46. The apparatus of example 45 wherein causing the apparatus to determine a last full physical resource block of the common physical resource block grid that fulfills a minimum guard band requirement for the at least one bandwidth part comprises causing the apparatus to: determine a last full physical resource block (PointC(n)) of the common physical resource block grid that fulfills a minimum guard band requirement ($GB_{min}$) for an $n^{th}$ bandwidth part ($BWP_n$) based on one or more of the following parameters: a sub-band bandwidth ($BW_{sb}$), wherein each of the bandwidth parts includes one or more sub-bands; a bandwidth part index (n) identifying the $n^{th}$ bandwidth part ($BWP_n$) of the plurality of bandwidth parts; a bandwidth ($BW_n$) of the $n^{th}$ bandwidth part ($BWP_n$), wherein the bandwidth ($BW_n$) of the $n^{th}$ bandwidth part ($BWP_n$) includes one or more sub-bands; a subcarrier spacing (SCS); a minimum guard band requirement ($GB_{min}$) for the $n^{th}$ bandwidth part ($BWP_n$); a size ($PRB_{size}$) of each of the physical resource blocks of the $n^{th}$ bandwidth part ($BWP_n$), expressed as a multiple of the subcarrier spacing (SCS); a sub-band index ($k_n$) of lowest sub-band contained on the $n^{th}$ bandwidth part ($BWP_n$); and a wideband channel guard band ($GB_{pointA}$).

Example 47. The apparatus of example 46 wherein causing the apparatus to determine a last full physical resource block of the common physical resource block grid that fulfills a minimum guard band requirement ($GB_{min}$) for the $n^{th}$ bandwidth part is based on the following:

$$PointC(n) = \left\lceil \frac{1000*(BW_{sb}*k_n + BW_n) - GB\min(BW_n, SCS) - GB_{PointA}}{PRB_{size}} \right\rceil - 1$$

Example 48. The apparatus of any of examples 45-47, wherein the last full physical resource block of the common physical resource block grid that fulfills a minimum guard band requirement ($GB_{min}$) for the $n^{th}$ bandwidth part is upper limited by at least one of the following: a number of physical resource blocks ($N_{RB}$) associated with a maximum bandwidth configuration of the wideband channel; and/or a number of physical resource blocks ($N_{RB}$ ($BW_n$)) associated with a bandwidth part-specific bandwidth.

Example 49. The apparatus of any of examples 29-48, further comprising causing the apparatus to: perform, by the user equipment, a per sub-band clear channel assessment for one or more sub-bands within the wideband channel, wherein each sub-band being less than the bandwidth of the wideband channel; selecting, by the user equipment, the at least one bandwidth part that includes physical resource blocks of one or more sub-bands that passed a clear channel assessment; and controlling, by the user equipment, transmitting data via the bandwidth part-specific physical resource block grid for the selected at least one bandwidth part.

Example 50. The apparatus of any of examples 29-49, further comprising causing the apparatus to: receive, by the user equipment, a signaled resource allocation, as either as a downlink assignment or an uplink grant, wherein the resource allocation is the physical resource blocks of the bandwidth part-specific physical resource block grid.

Example 51. The apparatus of any of examples 29-50, wherein causing the apparatus to determine, by the user equipment, a bandwidth part-specific physical resource block grid for the at least one bandwidth part comprises causing the apparatus to determine a bandwidth part-specific physical resource block grid for the at least one bandwidth part for a current channel occupancy time; and further causing the apparatus to control, by the user equipment, reception of data or control information during the current channel occupancy time via the bandwidth part-specific physical resource block grid for the at least one bandwidth part.

Example 52. The apparatus of any of examples 29-51, wherein the plurality of bandwidth parts comprise a plurality of nested bandwidth parts, wherein: the plurality of nested bandwidth parts include physical resource blocks provided within the common physical resource block grid; and at least a first bandwidth part having a first bandwidth overlaps and is provided as a subset of physical resource blocks with a second bandwidth part having a second bandwidth, wherein the second bandwidth is greater than the first bandwidth.

Example 53. The apparatus of any of examples 29-52, further causing the apparatus to: determine, by the user equipment, the minimum guard band requirement for the at least one bandwidth part based on a subcarrier spacing and the bandwidth of the at least bandwidth part.

Another embodiment provides a computer program comprising instructions which, when the program is executed by an apparatus, cause the apparatus to carry out embodiments described by means of FIG. 8, and other embodiments described herein.

According to another embodiment, an apparatus may include means (1008 and/or 1004, FIG. 9) for determining, by a user equipment in a wireless network, a starting physical resource block of a common physical resource block grid that is associated with a wideband channel, wherein a plurality of bandwidth parts are provided within the common physical resource block grid, each bandwidth part having a bandwidth that is less than the bandwidth of the wideband channel; means (1008 and/or 1004, FIG. 9) for determining, by the user equipment, a wideband channel guard band for the wideband channel, the wideband channel guard band provided between a lowest frequency of the wideband channel and a first usable physical resource block of the common physical resource block grid; and, means (1008 and/or 1004, FIG. 9) for determining, by the user equipment for at least one bandwidth part of the plurality of bandwidth parts, a bandwidth part-specific physical resource block grid that is a subset of the common physical resource block grid.

Figure 9:
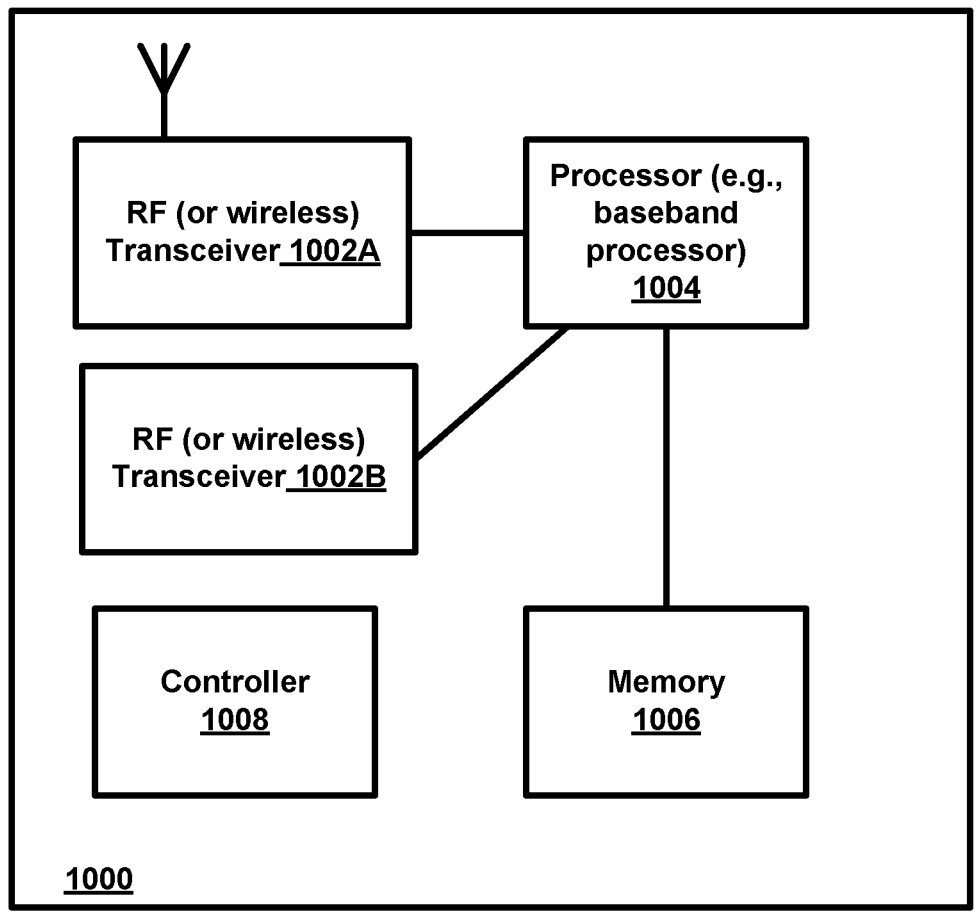
FIG. 9 is a block diagram of a wireless station (e.g., AP, BS, RAN node, UE or user device, or another network node) according to an example embodiment.

FIG. 9 is a block diagram of a wireless station (e.g., AP, BS or user device, or other network node) 1000 according to an example embodiment. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 9, a controller (or processor) 1008 may execute software and instructions, and may provide overall control for the station 1000, and may provide control for other systems not shown in FIG. 9, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, etc) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. A method comprising:
   determining, by a user equipment in a wireless network, a starting physical resource block of a common physical resource block grid that is associated with a wideband channel, wherein a plurality of bandwidth parts are provided within the common physical resource block grid, each bandwidth part having a bandwidth that is less than the bandwidth of the wideband channel;
   determining, by the user equipment, a wideband channel guard band for the wideband channel, the wideband channel guard band provided between a lowest frequency of the wideband channel and a first usable physical resource block of the common physical resource block grid;
   determining, by the user equipment for at least one bandwidth part of the plurality of bandwidth parts, a bandwidth part-specific physical resource block grid that is a subset of the common physical resource block grid; and
   wherein the plurality of bandwidth parts comprises:
   at least a first temporal bandwidth part that is temporarily available for use by the user equipment for transmission or reception based on a positive clear channel assessment, performed by either the user equipment or a base station, for one or more sub-bands of the at least first temporal bandwidth part; and
   at least a second bandwidth part that is unavailable for use by the user equipment for transmission or reception based on a negative clear channel assessment, performed by either the user equipment or the base station, for one or more sub-bands of the at least first temporal bandwidth part.

2. The method of claim 1, wherein the first usable physical resource block of the common physical resource block grid is a frequency offset or carrier offset from the starting physical resource block of the common physical resource block grid.

3. The method of claim 1, wherein the starting physical resource block of a common physical resource block grid is determined based on an absolute frequency or a relative frequency that is known by the user equipment or received in a message or signal by the user equipment from a base station.

4. The method of claim 1, wherein the determining, by the user equipment, a wideband channel guard band for the wideband channel comprises:
   receiving, by the user equipment from a base station, information indicating the wideband channel guard band provided between the lowest frequency of the wideband channel and the first usable physical resource block of the common physical resource block grid.

5. The method of claim 1, wherein the determining, by the user equipment for at least one bandwidth part of the plurality of bandwidth parts, a bandwidth part-specific physical resource block grid comprises:
   determining at least a lower edge or a lowest-frequency physical resource block of the bandwidth part-specific physical resource block grid for the at least one bandwidth part.

6. The method of claim 5, wherein the determining at least a lower edge or a lowest-frequency physical resource block of the bandwidth part-specific physical resource block grid for the at least one bandwidth part comprises:
   determining a first full physical resource block of the common physical resource block grid that fulfills a minimum guard band requirement for the at least one bandwidth part.

7. An apparatus comprising:
   at least one processor; and
   at least one memory including computer program code;
   the at least one memory and the computer program code configured to, with the at least one processor, cause the apparatus at least to:
   determine, by a user equipment in a wireless network, a starting physical resource block of a common physical resource block grid that is associated with a wideband channel, wherein a plurality of bandwidth parts is provided within the common physical resource block grid, each bandwidth part having a bandwidth that is less than the bandwidth of the wideband channel;
   determine, by the user equipment, a wideband channel guard band for the wideband channel, the wideband channel guard band provided between a lowest frequency of the wideband channel and a first usable physical resource block of the common physical resource block grid; and
   determine, by the user equipment for at least one bandwidth part of the plurality of bandwidth parts, a bandwidth part-specific physical resource block grid that is a subset of the common physical resource block grid;
   wherein the plurality of bandwidth parts comprises:
   at least a first temporal bandwidth part that is temporarily available for use by the user equipment for transmission or reception based on a positive clear channel assessment, performed by either the user equipment or a base station, for one or more sub-bands of the at least first temporal bandwidth part; and
   at least a second bandwidth part that is unavailable for use by the user equipment for transmission or reception based on a negative clear channel assessment, performed by either the user equipment or the base station, for one or more sub-bands of the at least first temporal bandwidth part.

8. The apparatus of claim 7, wherein the first usable physical resource block of the common physical resource block grid is a frequency offset or carrier offset from the starting physical resource block of the common physical resource block grid.

9. The apparatus of claim 7, wherein the starting physical resource block of a common physical resource block grid is determined based on an absolute frequency or a relative frequency that is known by the user equipment or received in a message or signal by the user equipment from a base station.

10. The apparatus of claim 7, wherein the plurality of bandwidth parts comprises:

at least a first temporal bandwidth part that is temporarily available for use by the user equipment based on a downlink transmission, detected by the user equipment, on the at least first temporal bandwidth part; and at least a second bandwidth part that is unavailable for use by the user equipment based on an absence of a downlink transmission on one or more sub-bands of the at least first temporal bandwidth part.

11. The apparatus of claim 7, wherein the user equipment is configured to receive control information from a base station indicating one or more configured bandwidth parts that may be used by the user equipment, wherein each bandwidth part includes one or more sub-channels, wherein the user equipment is further configured to perform the following:

perform a clear channel assessment on one or more sub-channels of one or more of the configured bandwidth parts; and select a temporal bandwidth part that is temporarily available for use, of the one or more configured bandwidth parts, based on a positive result of the clear channel assessment of all of one or sub-channels of the selected temporal bandwidth part.

12. The apparatus of claim 7, wherein:

the wideband channel comprises a plurality of 20 MHz sub-bands;

the apparatus further configured to:

perform, by the user equipment, a clear channel assessment on sub-band(s) of one or more of the bandwidth parts before transmitting via the bandwidth part, wherein the clear channel assessment is performed per sub-band.

13. The apparatus of claim 7, wherein causing the apparatus to determine, by the user equipment for at least one bandwidth part of the plurality of bandwidth parts, a bandwidth part-specific physical resource block grid comprises the apparatus to:

determine, by the UE, the bandwidth part-specific physical resource block grid for the at least one bandwidth part, for a current channel occupancy time; and wherein the at least one bandwidth part contains a subset of sub-bands defined by the wideband channel, wherein the at least one bandwidth part is used, by the user equipment, for reception of data or control information during the current channel occupancy time.

14. The apparatus of claim 7, wherein causing the apparatus to determine, by the user equipment, a wideband channel guard band for the wideband channel comprises causing the apparatus to:

receive, by the user equipment from a base station, information indicating the wideband channel guard band provided between the lowest frequency of the wideband channel and the first usable physical resource block of the common physical resource block grid.

15. The apparatus of claim 7, wherein causing the apparatus to determine, by the user equipment for at least one bandwidth part of the plurality of bandwidth parts, a bandwidth part-specific physical resource block grid comprises causing the apparatus to:

determine at least a lower edge or a lowest-frequency physical resource block of the bandwidth part-specific physical resource block grid for the at least one bandwidth part.

16. The apparatus of claim 15, wherein causing the apparatus to determine at least a lower edge or a lowest-frequency physical resource block of the bandwidth part-specific physical resource block grid for the at least one bandwidth part comprises causing the apparatus to:

determine a first full physical resource block of the common physical resource block grid that fulfills a minimum guard band requirement for the at least one bandwidth part.

17. The apparatus of claim 7, further causing the apparatus to:

determine, by the user equipment, a minimum guard band requirement for the at least one bandwidth part based on a subcarrier spacing and the bandwidth of the at least bandwidth part.

\* \* \* \* \*